United States Patent [19]

Verly et al.

[11] Patent Number: 5,123,057
[45] Date of Patent: Jun. 16, 1992

[54] MODEL BASED PATTERN RECOGNITION

[75] Inventors: Jacques G. Verly, Wayland, Mass.; Bryan Williams, Lawrenceville, Ga.; Richard L. Delanoy, Merrimack, N.H.

[73] Assignee: Massachusetts Institute of Technology, Cambridge, Mass.

[21] Appl. No.: 719,642

[22] Filed: Jun. 21, 1991

Related U.S. Application Data

[63] Continuation of Ser. No. 387,611, Jul. 28, 1989, abandoned.

[51] Int. Cl.$^5$ .............................................. G06K 9/66
[52] U.S. Cl. ...................................... 382/37; 382/14; 382/38; 364/274.4; 364/DIG. 1
[58] Field of Search ...................... 382/14, 15, 36, 37, 382/38, 39; 364/274.4, 275.9

[56] References Cited

U.S. PATENT DOCUMENTS

| | | | |
|---|---|---|---|
| 4,799,270 | 1/1989 | Kim et al. | 382/37 |
| 4,805,225 | 2/1989 | Clark | 382/37 |
| 4,845,610 | 7/1989 | Parvin | 382/30 |
| 4,958,375 | 9/1990 | Reily et al. | 382/36 |

OTHER PUBLICATIONS

"Silhouette Understanding System" by J. G. Verly, P. L. Van Hove, R. L. Walton, and D. E. Dudgeon, Reprinted from *Proceedings of IEEE-IECEJ-ASJ International Conference on Acoustics, Speech and Signal Processing*, Apr. 7-11, 1986, pp. 1457-1460.

"Automatic Object Recognition from Range Imagery Using Appearance Models" by J. G. Verly, B. D. Williams, and D. E. Dudgeon, Reprinted from *Proceedings of Workshop on Computer Vision*, Nov. 30-Dec. 2, 1987, pp. 244-246.

"An Experimental Target Recognition System for Laser-Radar Imagery" by B. D. Williams, J. G. Verly, and D. E. Dudgeon, *Proceedings of the Active Systems IRIS Conference*, Aug. 1988, pp. 1-16.

"An Experimental Target Recognition System for Laser Radar Imagery" by Dan E. Dudgeon, Jacques G. Verly, and Richard L. Delanoy, *Proceedings of the Image Understanding Workshop*, May 23-26, 1989, pp. 479-506.

*Primary Examiner*—Leo H. Boudreau
*Assistant Examiner*—David Fox
*Attorney, Agent, or Firm*—Hamilton, Brook, Smith & Reynolds

[57] ABSTRACT

A matching machine is provided for use in model-based entity recognition systems. Input to the matching machine includes a detected data event separated into portions and a set of predefined hierarchical models of desired entities. The matching machine employs recursive procedures to match data event portions against model parts, and records in list structures matches between event portions and model parts. For each match, a degree of match is calculated according to a function defining the involved model part. An essential feature of calculating a degree of match is the accumulation of working degrees of match (i.e. figures of merit reflecting the strength of match of a subset of data event portions to a subset of model parts and the degree to which the relationship of portions matches the predefined relationship of model parts in arbitrarily complex models). The degree of match is recorded in the list structures. From the highest degrees of match in the list structures, a best match between one of the models and the detected data event is determined.

35 Claims, 8 Drawing Sheets

NODES
V = VEHICLE    X-Ai = ANTENNA # i
T = TANK       X-G = GUN
H = HOWITZER   X-A&G = ANT. & GUN
A = APC

LINKS
S = SPECIALIZATION
P = PART

CONSTRAINTS
L = LEFT-OF
N = NEAR

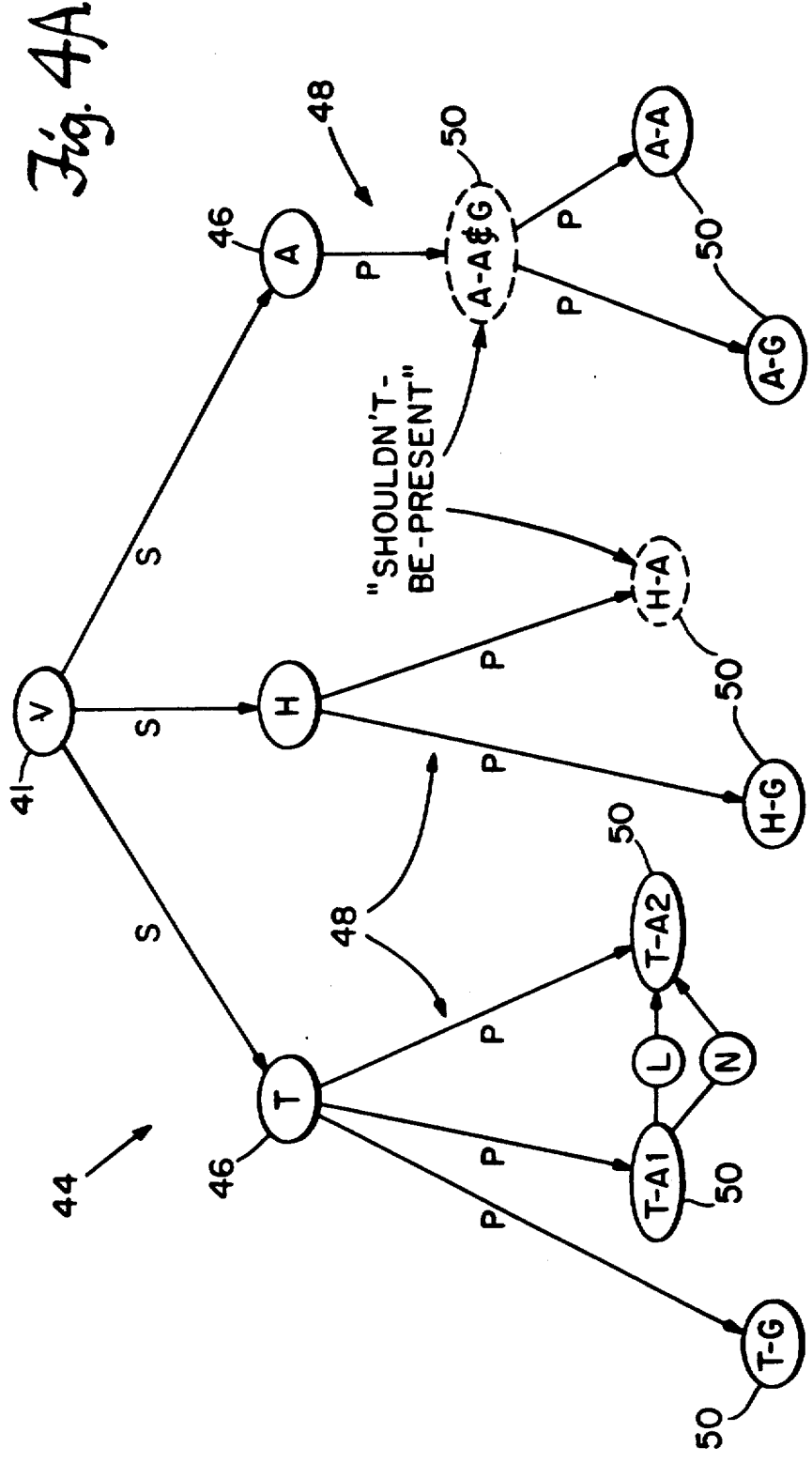

(type att 1 val 1
att 2 val 2
...
54 att n val n )

MODEL BASED PATTERN RECOGNITION

GOVERNMENT SUPPORT

Work described herein for the present invention was sponsored by the U.S. Defense Advanced Research Projects Agency.

This is a continuation of co-pending application Ser. No. 07/387,611 filed on Jul. 28, 1989, now abandoned.

BACKGROUND

In an increasing number of applications, there is a need to entrust computers with the task of making decisions automatically, in particular with the task of recognizing data events extracted from sensor data. Examples of such sensor data are 1-D signals such as speech, seismic, sonar, and electrocardiographic waveforms, or 2-D signals such as text and images provided by imaging sensors (e.g. TV, laser radar, X-ray or NMR scanners). Examples of events extracted are words (from a speech waveform), characters (from text), object silhouettes (from images), or any other entity that is of potential interest. Note that herein there is a distinction between the act of extracting an event from data and that of recognizing the event, or more exactly the entity from which the event is produced. Of particular concern is the problem of recognizing an extracted and decomposed event by matching the event and its parts to reference models Following is additional background on event recognition by way of a description of one of the application areas i.e. computer vision for such recognition. In general, computer vision is the field of computer science and artificial intelligence, concerned with the design of computer programs capable of automatically identifying images acquired by imaging sensors that can be highly specialized. Computer vision is a well established and rapidly growing discipline. Practical applications of computer vision include industrial inspection, autonomous navigation, and automatic target recognition (ATR).

In what follows, the ATR application is further discussed for purposes of illustration. Generally, the role of an ATR system is to detect and recognize military targets in imagery provided by one or more sensors. Examples of such sensors are $CO_2$ or GaAs laser radars, real- or synthetic- aperture millimeter wave radars, forward looking infrared imagers in any one of a number of bands, and video cameras.

An ATR system may also have access to other information such as terrain maps, navigational data, suspected target locations and target types (based on the constraints of the terrain and the scenario 3of interest), and meteorological data. Ideally, the output of an ATR system should primarily consist of a prioritized list of detected and recognized targets, their location, orientation and other important attributes.

The Department of Defense is very interested in ATR systems for a number of applications. For example, in the tactical arena, there is interest in sensor-carrying platforms that would locate targets, such as tanks, howitzers (self-propelled guns) and armored personnel carriers (APCs), in a limited geographical area where these objects may appear in large numbers. These platforms can either be manned or unmanned, and ground based or airborne. And ATR systems can function either entirely automatically from raw data to reports or commands to a weapons system, or as data screeners considerably reducing the flow of data coming from the sensors. In the strategic case, airborne platforms would look for mobile missile launchers in a large geographical area, a problem akin to looking for a needle in a haystack. Here also, the ATR systems could be used as simple data screeners or as elements of a fully automatic reconnaissance or weapon system. Obviously, fully automated ATR systems will be a crucial component of so called "smart" weapons, i.e. autonomous ground or air vehicles that would be launched from stand-off positions to search and engage specific targets.

Building a comprehensive ATR system is difficult for many reasons. First, a target's appearance in an image changes when the target's orientation with respect to the sensor's line of sight is modified. Second, a target's appearance is also affected by camouflaging, obscuring objects, the time of day or night, and/or weather conditions. Third, a target's appearance differs from one sensor to another (e.g., from a laser radar to a forward looking infrared imager) and across imaging modalities of the same sensor (e.g. range and intensities of a laser radar). Finally, even for a given type of image, the target's appearance will change with the characteristics of the sensor, typically with the angular resolution and, in the case of ranging sensors, with the range precision.

The current tendency in ATR-sensor-system design is to mount multiple imaging sensors on the same platform, all aimed in the same direction, either boresighted or perfectly registered by sharing the same optics. Even for a given sensor, multiple imaging modalities are possible (e.g., intensity, range, and Doppler in the case of a laser radar). Therefore, both a single sensor and a complex sensor configuration will provide a large variety of images of whatever lies in the field of view of the sensors. Of course, each type of image calls for a specialized set of ATR algorithms to extract and process the information specific to that type. One of the challenges of the multi sensor ATR problem is that of fusing the information extracted from each image type. This fusion can take place at several levels, ranging from the pixel level to the reasoning level. How to select the best information fusion strategy is an emerging area of research both in computer vision and in other fields.

SUMMARY OF THE INVENTION

The present invention provides an apparatus for matching data events extracted from sensory data to preconstructed models of entities desired to be recognized. The matching apparatus is a stand-alone module which may be employed in a variety of recognition systems. The inputs to the matching apparatus are an event extracted from sensory data (e.g. a TV image scene) and a partition of the event into portions also referred to as primitives. The output of the matching module is a list of all possible recognition hypotheses and preferably their corresponding, computed "belief" scores. The apparatus is fully general and application independent: it can match any applicable model to data events and portions provided that the model structure conforms to particular semantic rules and that the models make reference to quantifiable aspects of the events and portions.

The matching apparatus employs a processor means for matching extracted portions of a target to different parts of each predetermined model. The matching establishes for each model a list of calculated degrees of match between specific event portions (primitives) and specific model parts. Different degrees of match in the list correspond to different event portions matched against different model parts of the same model. Models are preferably constructed in a hierarchical, recursive fashion, with each member of the model consisting of one or more parts, which in turn can consist of any number of subparts, and so on. The relationship of parts and subparts to the whole model corresponds to the way observable features of the data (e.g. target) are expected to reflect actual entities (e.g., a 3-D object). To that end, the matching apparatus recursively matches different target portions to different model parts.

In a preferred embodiment a model library contains a description of the events that are to be recognized. For example, if the extracted events are silhouettes of 3-D objects then the library should contain, for each 3-D object of interest, a description of how its silhouette should appear in the particular imagery of interest. Since the models describe what events actually look like (as opposed to describing what the underlying entity is), the models are referred to as Appearance Models (AMs). Each AM is a semantic-net-like structure that describes an entity (e.g., a 3-D object, a language character, ...) in terms of the properties of its observable parts and the relationships among them (using mathematical functions). Furthermore, the AMs for all the entities of interest are organized in an AM hierarchy defining entity classes or categories. For example, if one is interested in vehicles, one might consider the categories of civilian and military vehicles; then, within the category of military vehicles, one may want to further distinguish between armored and nonarmored vehicles; and, finally, within the subcategory of armored vehicles, one may want to define AMs for specific types of armored vehicles such as tanks, howitzers, and APCs.

AM-hierarchy-based matching is the process in which an extracted event and a list of portions, all derived from the event, are matched against an AM hierarchy.

With that, the matching apparatus works in three steps referred to as symbolic matching, evidential processing, and match selection.

In the pruning phase of "symbolic matching", the event is matched against the properties of the category nodes of the AM hierarchy. This matching is carried out in a depth-first manner beginning at the root of the AM hierarchy. At each node, the event is matched against the properties of the node and a degree of match is computed (a degree of match is a number in the closed range [0.1] indicating the strength of a match). If this degree of match is greater than a globally defined match threshold, then the depth-first matching continues recursively with the subcategories of the node. If the degree of match is not above the match threshold, then the event is considered to characterize an entity that cannot belong to the category defined by the node. In this case, the entity also cannot belong to any of the subcategories of the node, so the depth-first matching is not continued with these subcategories. This recursive matching procedure collects those terminal nodes of the hierarchy of categories that it reaches and determines to have a degree of match greater than the match threshold. Since terminal nodes of the hierarchy of categories are the roots of AMs, the effect of the pruning phase is to collect a set of AMs for entities whose high-level descriptions match the event. The AMs that are collected in this way are called active AMs (their roots are referred to as the active object label nodes)

The AM-matching phase is then performed independently on each of the active AMs. For a given active AM, distinct event portions are arbitrarily paired with each of the AM's terminal nodes: note that some event portions may remain unused (if there are more portions than terminal nodes), or some nodes may remain unpaired (in the opposite case). A corresponding degree of match is computed for each pairing by applying the node's properties to the event portion. After the terminal nodes are paired with the event portions, degrees of match are then computed for all the higher-level nodes and for all the constraints in the given AM. These degrees of match are computed recursively, from the terminal nodes, up to and including the AM's root node. "AM matching" is implemented through a depth-first traversal of the AM of interest. In highly simplified terms, the major steps of this recursive procedure, starting at the root node of the AM, are:

1. If the current node is a terminal node, then a degree of match is computed by applying the properties of the node to the event portion paired with the node (if no event portion could be paired with the node, this fact is recorded and the degree of match is assumed to be unity).

2. If the node is not a terminal node, then it is necessarily an internal node (i.e., a node that contains parts). In this case, the matching involves three steps:

(a) This whole AM-matching procedure is recursively applied to each of the children (i.e., parts) of the internal node. After doing this, a degree of match is available for each part and constraint defined beneath the internal node.

(b) A degree of match is computed for each constraint defined between parts of the internal node by applying the constraint function defining the constraint to the constrainee nodes.

(c) The degree of match for the internal node is derived from the previously computed degrees of match for its children parts and the constraints between them (e.g. from a aggregation of degrees of match for children parts and constraints).

One of the goals of "AM matching" is to determine the degree of match for the root node of the AM of interest. This number indicates how well, for a particular combination event portions-to-atomic-part pairings, a data event and its primitives (portions) match the AM.

All other combinations of pairings are examined in turn, and corresponding degrees of match for the same root node are computed. The combination with the highest degree of match is then selected, as it represents the best possible assignments of event portions to atomic model parts for the given AM. All of the above operations are repeated in turn for every active AM.

Thus, "symbolic matching" produces a list of all active AMs and, for each of them, the best possible combination of pairings and the associated degrees of match for each of the AM's parts and constraints.

In the evidence-collection phase of "evidential processing", the evidence for or against the various active object-label nodes is established. Simplifying somewhat, the children parts of each active object-label node and the constraints that might exist between these parts constitute the available evidence. And the previously computed degrees of match are used to quantify the support provided by each piece of evidence. Notice that the parts and constraints that are not directly "attached" to an object-label node are ignored in subsequent developments, however, as a result of the recursive calculation described earlier, their degrees of match are effectively imbedded in the numbers that characterize the individual pieces of evidence.

The role of the evidence-combination phase is to combine the various pieces of evidence just obtained. The framework used to aggregate the evidence is the Dempster-Shafer (DS) theory of evidence. Before discussing the actual implementation of this processing phase, the terminology used must be introduced. A frame of discernment $\theta$ is constructed that consists of each of the active object label nodes plus the symbol "none": the addition of this symbol is required to make $\theta$ exhaustive and conveniently allows the possibility that an event might be classified as "unknown". To be precise, each element of $\theta$ corresponds either to the object-label hypothesis "The events and primitives under consideration correspond to the entity 1 of the AM hierarchy" or to the null hypothesis "The event and primitives under consideration do not correspond to any of the entities in the AM hierarchy". To use the DS framework, one must define a belief function for each piece of evidence available. In the current circumstances, the most natural approach is to define each belief function through its basic probability assignment (bpa), which is itself specified by a number, called basic probability number (bpn), for each of the elements of the power set of $\theta$. An important type of belief function is the simple support function that assigns a nonzero bpn (the degree of support), say m, to a given subset of $\theta$ (the focus) and the balance 1 m (the "ignorance") to $\theta$ itself.

Going back to the description of the evidence combination phase, we first create a bpa for each piece of evidence collected in the previous phase and derive the appropriate focus and degree of support from the degree of match associated with that piece of evidence. In brief, an increasingly high degree of match for a piece of evidence related to entity 1 provides an increasing degree of support for the singleton subset of $\theta$ that contains 1. Conversely, an increasingly low degree of match for the same piece of evidence provides an increasing degree of support for the subset containing all elements of $\theta$ with the exception of 1. Finally, the various bpas are combined by using Dempster's rule of combination: the result is a single bpa that gives the aggregate support in the various elements of the power set of $\theta$, or, equivalently, in the various subsets of $\theta$.

The final bpa produced above forms the basis of a selection rule that determines which if any, of the object-label nodes in the AM hierarchy "best matches" the event and primitives (portions) under consideration. The rich semantics of the DS formalism make possible the design of a number of different selection rules on the basis of this bpa.

The selection rule employed in the present system is quite simple, however. The selection is made solely by looking at the belief associated with each of the singletons in the above bpa (each singleton is associated with one specific object-label hypothesis or the null hypothesis). The singleton (and, thus, the corresponding hypothesis) with the highest belief is selected. Since one of the hypotheses is the null hypothesis, it is possible that the event will be declared to be an unknown entity. Otherwise, the event will be declared to be an entity corresponding to one of the active object-label nodes of the AM hierarchy. Since the belief (or degree of belief) associated with each singleton is simply equal to the basic probability number (bpn) that appears in the overall bpa computed above, no calculation is required to go from bpns to degrees of belief. In spite of this, it is useful to view the selection as being based on degrees of belief, since these are the quantities to consider for more complex selection rules (see below).

The simple selection rule described above is very effective in practice. However, the DS formalism naturally lends itself to the formulation of more complex selection rules. For instance, in some cases, the best answer for a given matching problem might correspond to a disjunction of two or more object-label hypotheses (e.g., "The event and primitives under consideration correspond to either entity 1 or entity $l_2$). The DS formalism makes the implementation of such a selection rule straight-forward. Future enhancements to the present system will likely include such improvements of the selection rule. As pointed out above, the quantities to be considered to rank the various hypotheses are the corresponding degrees of belief. In this more general case, bpn and degrees of belief are not equal and the necessary degrees of belief must be computed from the bpa produced by the evidential-processing step.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustration of the principles of the invention.

FIGS. 4a and 4b are schematic illustrations of contour-based and region-based appearance model hierarchies, respectively.

DETAILED DESCRIPTION OF THE PREFERRED EMBODIMENT

Figure 1:
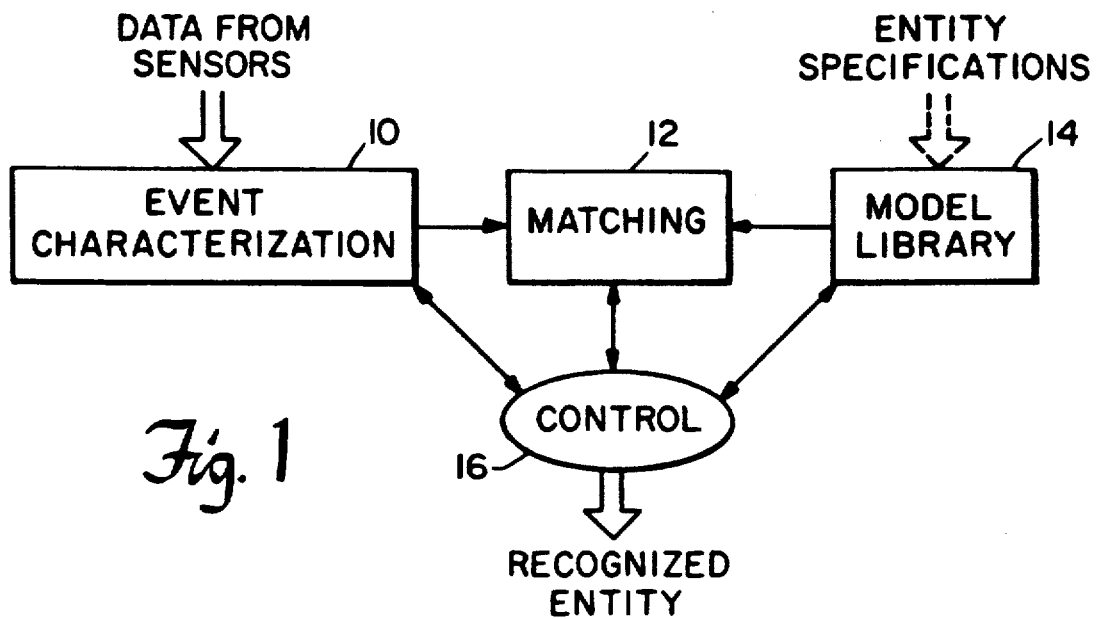
FIG. 1 is a block diagram of a recognition system embodying the present invention.

Data from sensor(s) are received by the event characterization module 10 of the recognition system as illustrated in FIG. 1. This module 10 performs a series of computations for extracting from these input sensory data some relevant features, called events, and for decomposing each event into some relevant constituent portions called primitives. Module 10 passes symbolic descriptions of the event and its primitives to a matching module 12 described later. Therefore, module 10 effectively acts as a converter from raw sensory data to symbolic descriptions. One or more events can be extracted from the data, but the matching module 12 can only operate on one event and its portions at a time.

A model library 14 also provides input to the matching module 12. The library 14 is a data structure organized as a hierarchy of categories of entities desired to be recognized Each entity is in turn a hierarchy of facts that can be reliably extracted from the data thorough the event characterization module 10.

The matching module 12 compares the extracted event and its constituent portions to the model library and determines which model(s) in the library substantially match(es) the event and its primitives. The matching module 12 is designed to operate with complete ignorance of the means for extracting and decomposing the event and the details of the categories, entities, and facts described in the model library. Thus, the matching module 12, is totally application independent: the same module 12 can be used in a large number of unrelated recognition applications. The only requirement is that the features used in constructing the library must also be quantified or qualified within the symbolic descriptions provided by the event extraction module 10 (e.g., if the length of an atomic part in the model library must be within a specified range of values, then the description of each event's primitives must include an attribute that is equal to the measured value of this length).

A control module 16 orchestrates the operation of the other components of the recognition system in FIG. 1. The control module 16 can have various degrees of complexity. In the simplest case, its role is simply to operate first the event characterization module 10 (i.e., extraction and decomposition) and then the matching module 12. In a more advanced realization, the embodiment may be equipped with a feedback mechanism which allows the system to back up and try alternate means of recognition based on previous results or to consider alternate sets of events and portions.

One particular case of a preferred embodiment is that of recognizing 3-D objects from image-data in computer vision. In this case the data in FIG. 1 are image(s), the entities are 3-D objects, and the events are object characteristics such as its silhouette in the image(s) for some arbitrary point of view and state of articulation of the 3-D object.

Figure 2:
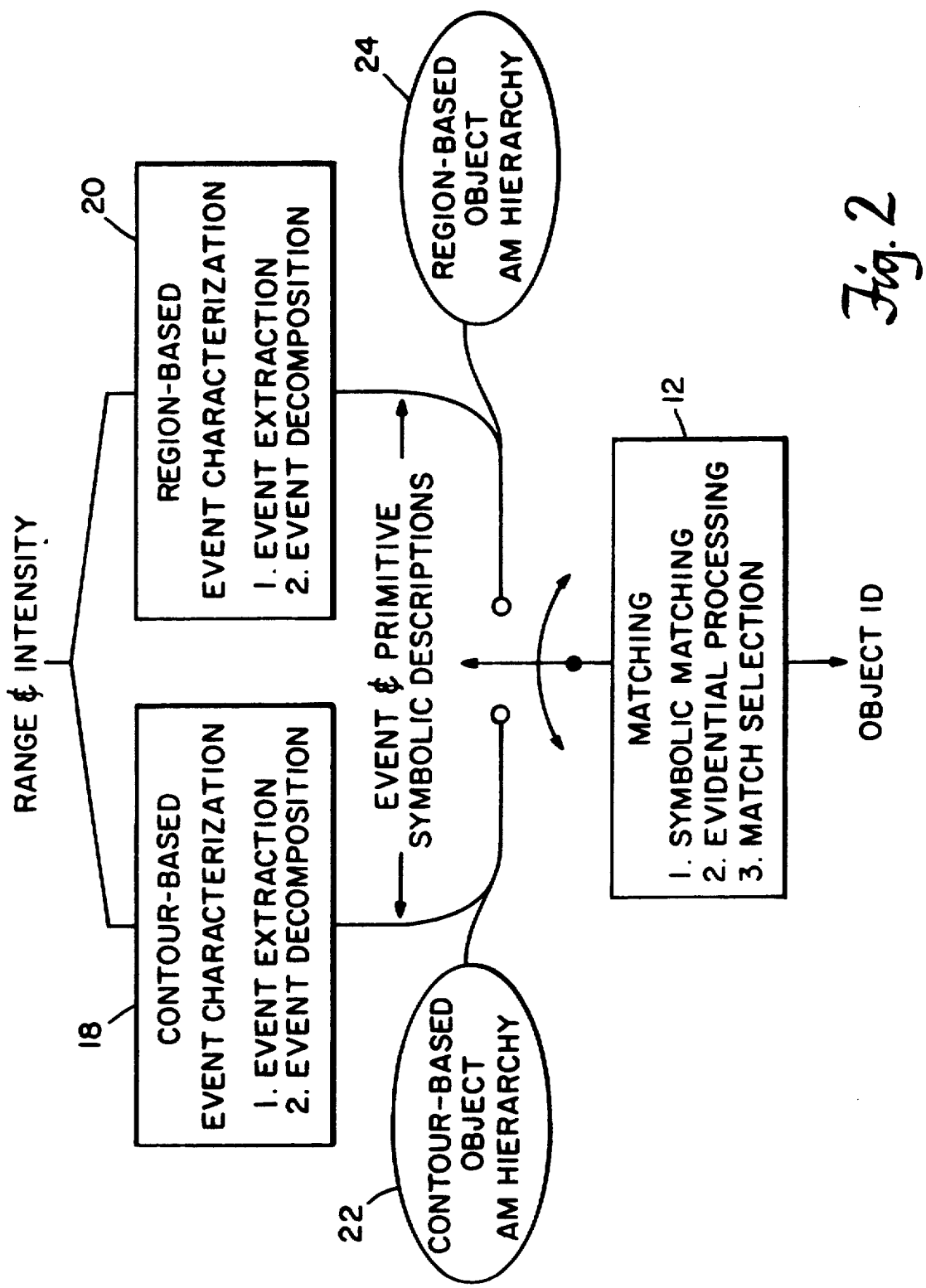
FIG. 2 is a block diagram of a preferred embodiment of the present invention with laser-range and intensity imagery of sensed entities.

A further specialization of the preferred embodiment is illustrated in FIG. 2. Here, the goal of the system is to automatically recognize tactical targets, (e.g., tanks howitzers, and armored personnel carriers) from images acquired by a 10.6 micron (infrared), $CO_2$ laser-radar with low range precision. Here the inputs to the event characterization modules 18, 20 are a pair of low range and (active) intensity images. Since the system can operate either in contour-based mode (rising edge extraction) or in region-based mode (rising region segmentation), the system contains two independent event characterization modules 18, 20. In the contour-based case, the event is a silhouette contour and its primitives are subcontours (arcs and corners). In the region-based case, the event is a silhouette region and its primitives are subregions.

Since the events extracted by the contour based module 18 and the region based 20 are quite different, two independent model libraries 22, 24 are employed. In each library, the model descriptions are organized in an appearance model (AM) hierarchy (described later) that indicates how the 3-D targets of interest should appear in the 2-D input imagery for a wide range of orientations, distances and states of articulation. Input to the matching module 12 is then from (i) the contour-based module 18 and the contour-based library 22, or (ii) the region-based module 20 and the region based library 24.

In spite of the above differences, the same matching module 12 is used for both modes of operation. Hence, the preferred embodiment of FIG. 2 actually includes two independent target recognition systems operating on the same sensory data and relying on the same general purpose matching module 12.

Although the above-embodiments describe the present invention as it applies to the object or target recognition problem, it is understood that the principals of the invention are applicable to a wide range of recognition problems in computer vision and other fields.

Figure 3A:
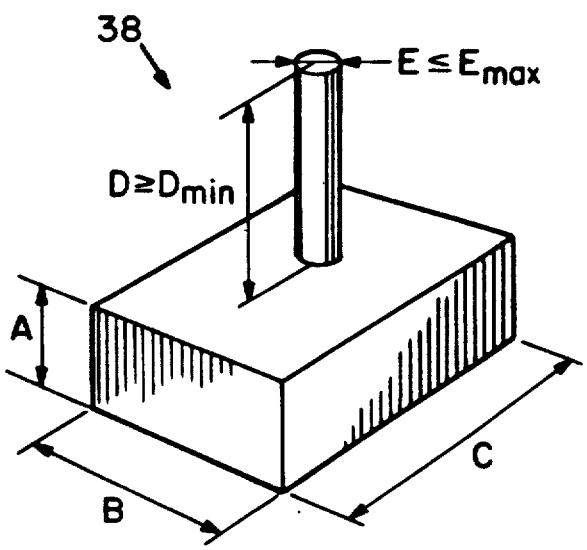
FIGS. 3a-3c are schematic illustrations of an entity (3-D object), a corresponding data event (the objects basic silhouette) and the event's appearance model.
Figure 3B:
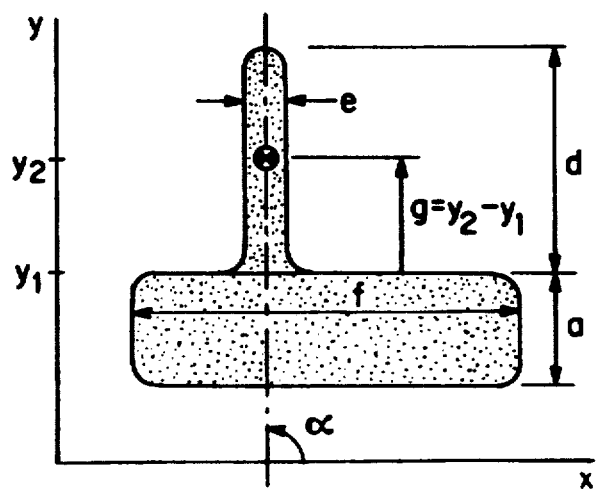
Figure 3C:
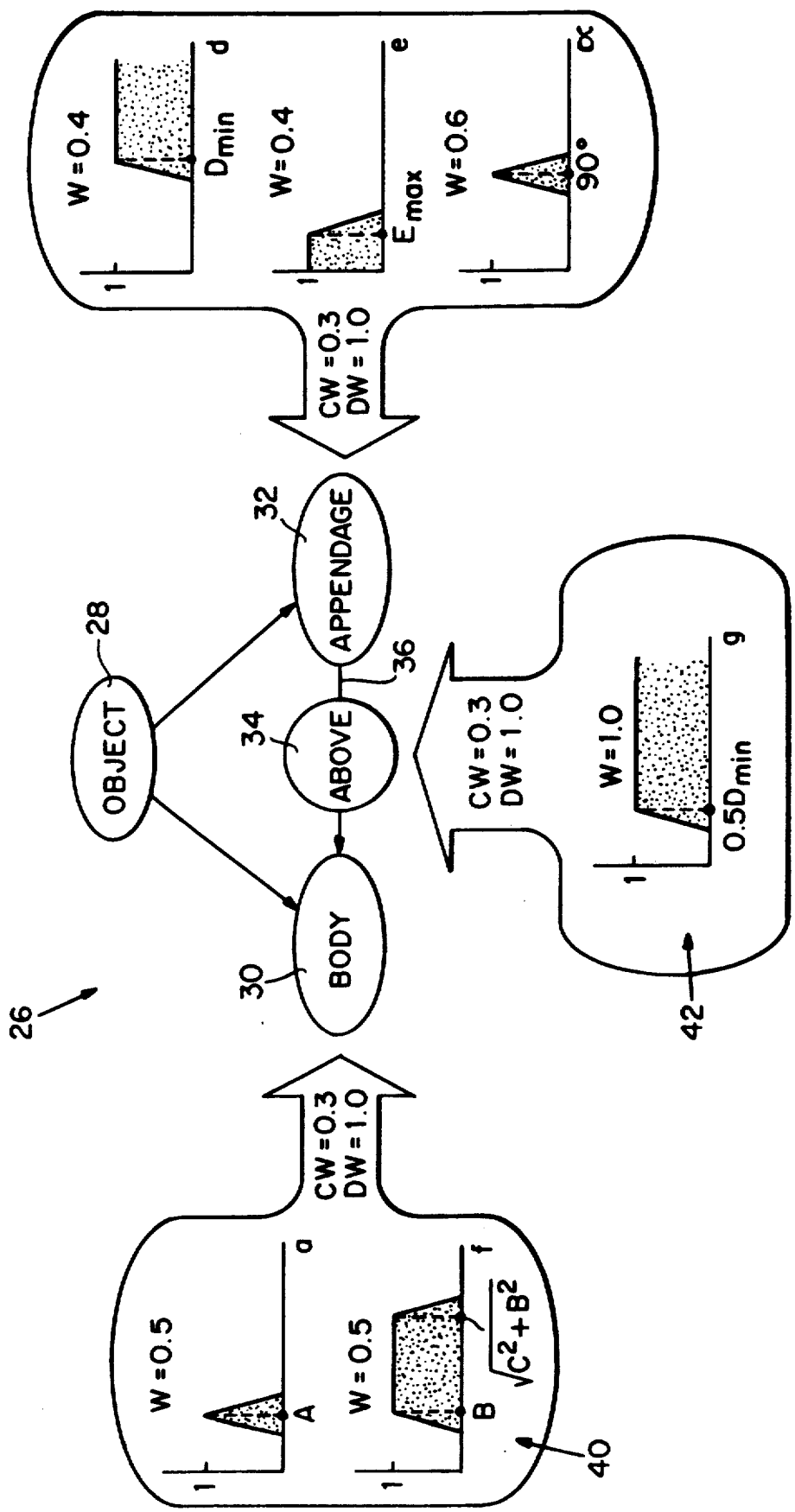

FIGS. 3a–3c illustrate the formation of appearance models (AMs) utilized by the object recognition system of FIGS. 1 and 2. Although the illustrated AMs are for object or target recognition, the principles apply to the formation of AMs for arbitrary entities. Appearance models describe the expected appearances of objects in images. An AM is defined for a given object in a given type of image seen from a point within a given range of viewpoints. In the present system, each AM describes an object in terms of its parts and the relations among them and is defined using tree structures that are similar to semantic networks.

Specifically, a root node 28 (FIG. 3c) of the tree identifies the object being described by the AM 26. Branches lead from the root node 28 to element nodes 30, 32 at a succeeding level. Each element node 30, 32 represents and describes an essential part (body and appendage) of the object. Parts may be defined in terms of their own parts and so on. An AM tree may therefore comprise several ordered levels of parts (element nodes). The terminal nodes of this tree contain descriptions of the primitive parts that can be matched against image data in order to determine whether the primitive parts (or atomic parts) are present in an image.

Branches between element nodes 30, 32 represent relationships between the object parts represented by the nodes 30, 32. Constraint nodes 34 on branches 36 between nodes indicate limitations or constraints in the relationship between the object parts represented by the nodes 30, 32 at the opposite ends of the branch 36. These constraints typically include expected spatial relationships, the expected relative sizes of parts, and the ways in which the parts are expected to appear joined to one another in an image. The constraints together with the ordered levels of nodes, define the expected possible appearances of an object in an image. Thus constraint node 34 labelled "above" on branch 36 between element nodes 30 and 32 indicates the constraint "above" on the spatial relationship between the body and appendage parts of object 28.

Hence, AMs 26 are not full 3-D models; instead, they are an attempt to describe all possible appearances of an object over a limited range of aspects. The parts chosen for description in the model are those believed to be identifiable given the type of imagery and the means of extracting objects and their parts from images.

The description of a given part must take into account the range of possible viewpoints. For example, an appendage that protrudes from the front of an object will appear longest while the object is viewed from the side. As the viewpoint changes in moving around the object, the apparent length of such an appendage will change. When the object is viewed from the back, the appendage will not even be visible. An AM description of such an appendage takes these different appearances into account: it includes (among other things) a specification of the range of lengths the appendage can appear to have.

Spatial relations among parts may also vary with perspective. For example, an appendage may appear to jut out from the left side of an object from one perspective and to jut out from the right side from another perspective. Other perspective dependent relations may also hold. For example, the size of an appendage should be consistent with the apparent size of the rest of the object. If the length of an appendage suggests an object is being viewed from the side, the sizes of other object parts should be consistent with such a viewpoint. All these variations are captured by each appearance model 26 along with the tree structure as described below.

For purposes of illustration, FIG. 3a depicts in three dimensions an object 38 desired to be recognized by the system of the present invention. The object is defined by width, length and height dimensions A, B, C, D and E of various parts of the object. Where reproductions of the object are known to vary, for example in dimensions D and E, these two dimensions are designated as variable but are at least some known $D_{min}$ and $E_{min}$, respectively.

From the dimensional definition of the object 38 in FIG. 3a, the expected appearance of a general 2-D silhouette of the object is obtained and shown in FIG. 3b. From the general silhouette, other silhouettes of the object from different viewpoints around the object may be established by changing the values of the different measured silhouette dimensions a, d, e, f, g and $\alpha$. The range of the values for these silhouette dimensions are defined in the corresponding AM 26 of FIG. 3c along with the tree outlining the essential elements of the object 38 and their relationships with each other.

It is noted that this model 26 is appropriate only for those types of imagery that make possible the extraction of object silhouettes.

The model 26 assumes that the object will be viewed only from points at roughly the same "altitude" as the center of the object with reference to the ground on which the object sits, and that the object is roughly horizontal in the image. For these viewpoints, the silhouette of the object as illustrated in FIG. 3b will always consist of two parts, a body and an appendage. Each of these silhouette parts is represented by pertinent labelled element nodes 30, 32 in the AM tree of FIG. 3c and is described by a set of property functions collectively termed a "property set" of the node. A property function is a fuzzy predicate defined over the values of some part attributes. The value returned by a property function P for a given attribute "a" is a value in the closed range [0,1] indicating the degree to which the attribute "a" satisfies the property defined by P.

For instance, consider the property function 40 defined in the AM 26 for the measured base width f in FIG. 3b determining the expected length of the body part of the detected silhouette. As graphically illustrated in FIG. 3c, this function 40 returns (i) a value of 1.0 for regions whose length is between B and the square root of the sum $C^2+B^2$, (ii) a value between 0.0 and 1.0 for regions whose length lies just outside this interval, and (iii) a value of 0.0 for regions of any other length. The definition of this function 40 reflects the fact that the projected length of the body is expected to vary between B and square root of the sum $C^2+B^2$ for the assumed range of viewpoints. The rising and falling ramps on either side of this "expected length" interval are meant to allow for variations in measured region length due to sources of error such as image noise, inaccurate silhouette extraction, and inaccurate computation of region length.

In a similar fashion, property functions are also defined for measured body height a, appendage diameter e, appendage height d, and appendage major axis orientation $\alpha$ with respect to the plane on which the body sits.

As described above, the constraint node 34 indicates that in all silhouettes of the object 28, the appendage must be sensed to be positioned above the body. This constraint is quantitatively defined by a fuzzy predicate 42 in the AM 26 of FIG. 3c for measured values of g, the signed distance between the center of gravity of the appendage region and the top of the body region. The fuzzy predicate 42 or constraint function returns (i) a value of 1.0 for measured distances g greater than half of $D_{min}$, (ii) a value between 0.0 and 1.0 for measured distances g just less than half of $D_{min}$, and (iii) a value of 0.0 for any other measured distances for g.

Figure 4B:
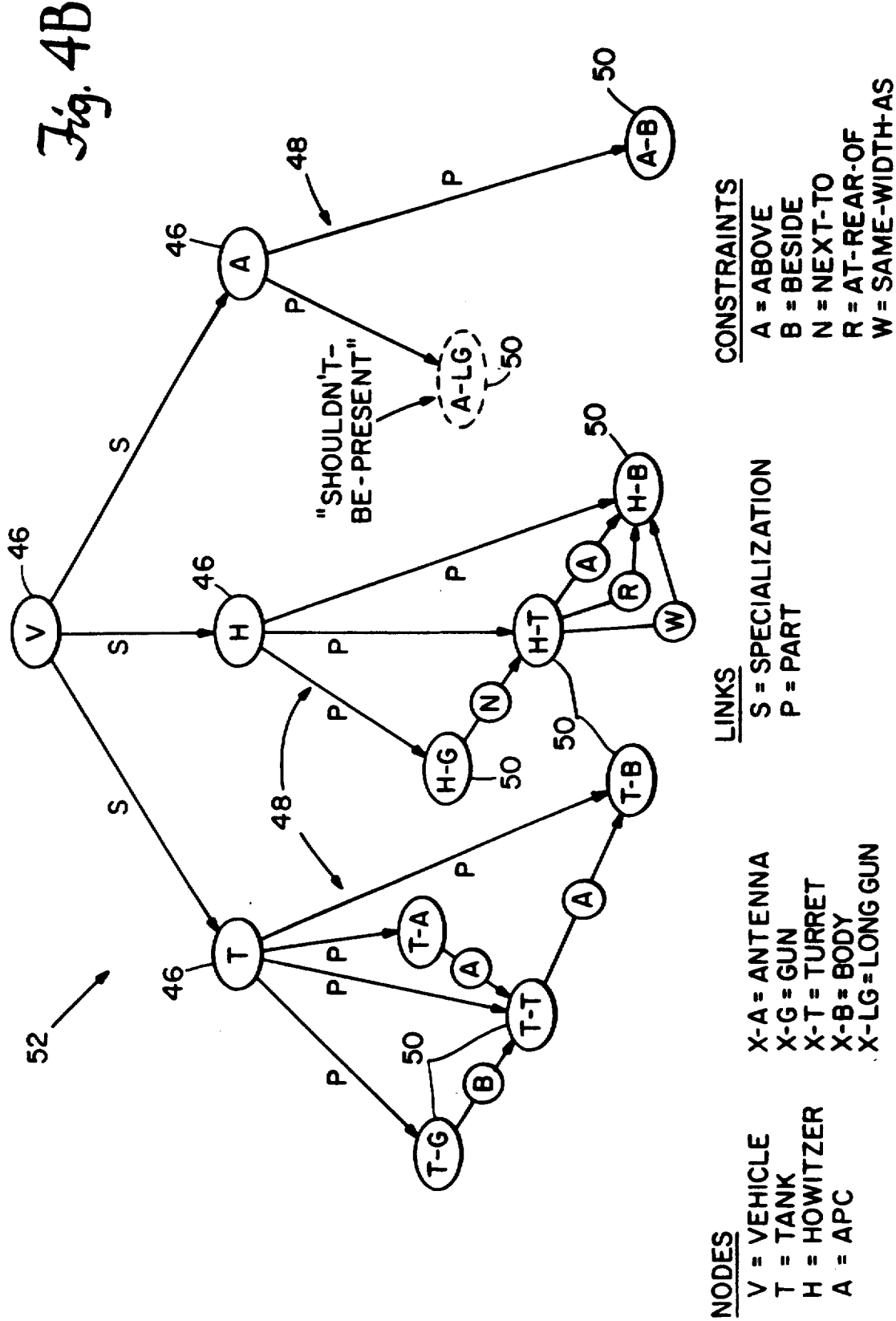

Each object that the system of the present invention is expected to recognize is defined by an AM in the foregoing manner, and all such AMs are organized in a hierarchy called an AM hierarchy to form a model library. That is, the AM hierarchy provides the contents of the model library 14 (22,24) of FIGS. 1 and 2. FIG. 4a illustrates the AM hierarchy 44 used with the contour based module 18 of the preferred embodiment of FIG. 2. This AM hierarchy 44 describes the expected appearance of silhouette contours in infrared laser radar range imagery for vehicles (V) of type tank (T), howitzer (H), and armored personnel carriers (A). The corresponding AM hierarchy 52 for the region based module 20 of FIG. 2 is shown in FIG. 4b.

The AM hierarchy 44 itself is a tree structure formed of an ordering or hierarchy of category nodes 46 at an upper portion of the tree and different AMs 48 (their trees) under the category nodes 46 to form a lower portion of the AM hierarchy tree 44. Each category node 46 represents a category of object desired to be recognized by the system. A category node 46 can have one or more children category nodes similar to an element node of an AM being able to have one or more children element nodes. Children nodes of a category node 46 represent subcategories of the category represented by the category node. The hierarchy of category nodes 46 alone in FIGS. 4a and 4b is the subtree containing the nodes labelled V, T, H and A. The root node V of the AM hierarchy is the root node of the hierarchy of category nodes 46 contained within the AM hierarchy tree 44. The terminal nodes T, H, A of the hierarchy of category nodes 46 are the root nodes of the AMs 48. Hence, in FIGS. 4a and 4b the AMs 48 (trees thereof) are rooted at nodes T, H and A.

There are certain restrictions on node configurations in the AM hierarchy tree 44 as follows. The tree is free of loops. Neither a category node 46 or an AM element node 50 can have both category nodes and AM element nodes for children nodes. An AM element node 50 (alone or in combination with other category nodes 46 or AM element nodes 50) cannot have a category node 46 for a child node. Two or more category nodes can have a common child category node. Different AM element nodes 50 (by themselves or in combination with other category nodes 46) cannot have a common child AM element node 50.

Figures 5, 6:
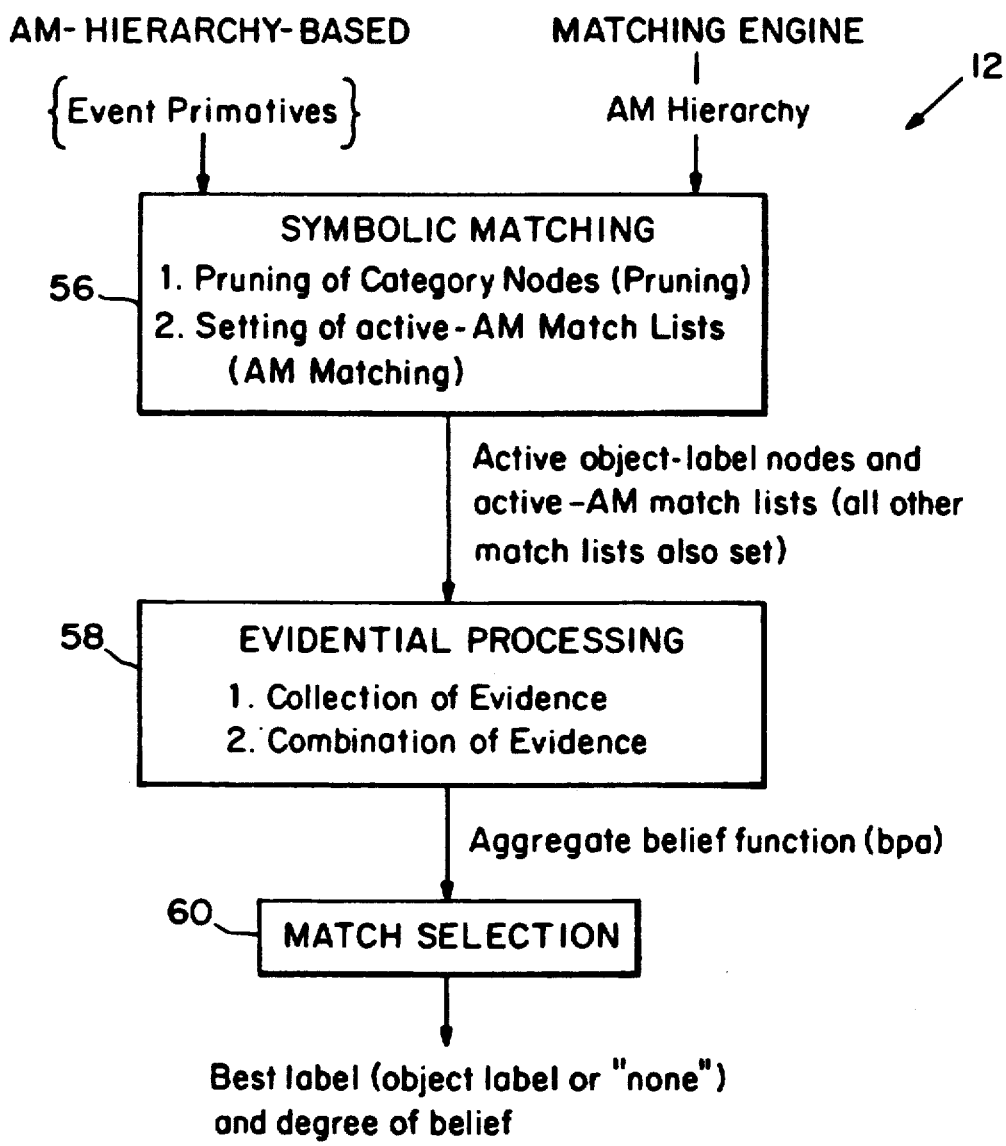
FIG. 5 is a schematic illustration of a list programming structure employed by the present invention to describe a node or branch of an appearance model hierarchy.
FIG. 6 is a block diagram of a matching module of the embodiments of FIGS. 1 and 2.

The AM hierarchy tree 44 or 52 is implemented by a plurality of list programming structures. Each member of the tree (node or branch) is represented by a different list structure. FIG. 5 provides an illustration of the general list structure 54 employed by the present invention. The "type" field in the structure 54 indicates whether the list structure is representing a node (except constraint node), a constraint (i.e. constraint node and associated branch), a branch which points to a category node, or a branch which points to an element node of an AM hierarchy tree. Hence, the "type" field is set to a value of "an-am-node", "a-constraint", "a-specialization-link" or "a-part-link" respectively. The "attribute-value" fields of the list structure 54 indicate the name and value of various attributes of the tree member that is represented by the list structure. A name of an attribute is held in the "attribute" portion of the field, and a quantifying amount is held in the corresponding "value" portion of the field. Different types of attributes are used for different values of the "type" field.

In particular, a "type" field value of "an-am node" has different attributes depending on whether the AM hierarchy tree node being represented by the list structure 54 is (i) a category node which is not a root of an AM of the AM hierarchy tree, (ii) a root node of an AM of the AM hierarchy tree, (iii) a non-terminal element node of an AM of the AM hierarchy tree, or (iv) a terminal node of the tree. Reference is made to Table I for an account of what attributes are allowed for a given node type (i)–(iv) above.

TABLE I

| | "an-am-node" TYPE | | | |
|---|---|---|---|---|
| ATTRIBUTE | Non-AM-Root Category | AM Root Node | Internal Element | Term'l Element |
| has-name | X | X | X | X |
| has-property-set | X | X | | X |
| has-constraints | | X | X | |
| has-confirming-weight | | | X | X |
| has-disconfirming-weight | | | X | X |
| has-upward-links | X[a] | X | X | X |
| has-downward-links | X | X | X | |
| shouldnt-be-present | | | X | X |
| has-match-list | X | X | X | X |

[a] except for root node of AM hierarchy

The "has-name" attribute indicates in the corresponding value portion of the attribute-value field, the name of the node that is represented by the list structure 54. In particular, the names of the root nodes of AMs are the labels which may be given to an event that is being matched against the AM hierarchy by the system for purposes of recognition.

The "has-property-set" attribute provides in the corresponding value portion of the attribute-value field, a list (possibly empty) of elements, each of the form (property-function property weight)

The list described the properties of the entity (object) part or entity (object) represented by the node that is represented by the list structure 54. The only nodes that possess a "property set" are the category nodes including root nodes of AMs and terminal nodes. Thus these nodes are also referred to as property nodes. The word "set" in the phrase "property set" is understood to mean a totally ordered set. "Property-function" is a function meant to be applied to a single image event or primitive and to return a number (fuzzy predicate) in the closed range [0.1] indicating the degree to which the description satisfies the property defined by that function. "Property-weight" is a number in the closed range [0,1] that is associated with each property function to indicate the importance of that property relative to the other properties defined in the same property set. The weights are denoted by W FIG. 3c.

The "has-constraints" attribute provides in its corresponding value portion of its attribute-value field, a list of constraints among the parts represented by an internal node (any AM node with the exception of terminal node). Each constraint typically involves two or more parts of the internal node and is defined by a function which is meant to be applied to primitive descriptions that match the terminal parts associated with the parts directly involved in the constraints. Each constraint in the list is "owned" by the internal node of concern and is not shared with any other.

The "has confirming-weight" attribute has for a corresponding value a number in the closed range [0.1] which indicates the relative importance of finding a perfect match to the part represented by a node in confirming the presence of the object or part which contains the part represented by the node. At the extremes, a value of 0 indicates that finding a perfect match to the part represented by a child node does nothing to confirm the presence of the object or part represented by the parent node of the child node. A value of 1 indicates that finding a perfect match to the part (child node) absolutely confirms the presence of the containing object or part (parent node). The exact role of the confirming weight will become clear when the equations that include it are given later. Confirming weights are denoted by CW in FIG. 3c.

The "has-disconfirming" weight attribute has for a corresponding value a number in the closed range [0,1]. This number indicates the relative importance of the total failure to find a match to the part represented by a child node in "disconfirming" the presence of the object or part represented by the parent node of the child node. At the extremes, a value of 0 indicates that the total failure to find a match to the part (child node) does nothing to disconfirm the presence of the object or part (parent node), which contains it, i.e. the part is optional. A value of 1 indicates that the total failure to find a match to the part (child node) absolutely disconfirms the presence of the containing object or part (parent node), i.e. the part must absolutely be present. The exact role of the disconfirming weight will become clear with the equations given later. Disconfirming weights are denoted by DW in FIG. 3c.

The "has-upward-links" attribute provides in its corresponding value a list of members of the AM hierarchy tree which are all of type "a-specialization-link" or "a-part-link", point upward to parent nodes and are compatible with the restrictions on the AM hierarchy node configurations stated previously. Parent nodes reached through specialization links represent higher categories which contain the category represented by the subject node of list structure 54, while parent nodes reached through part links represent objects or parts that contain the part represented by the subject node of list structure 54.

The "has-downward-links" attribute provides in its corresponding value a list of members of the AM hierarchy tree which are all of type "a-specialization-link" or "a-part-link", point downward to the children nodes, and are compatible with the restrictions on the AM hierarchy node configurations given previously. Children nodes reached through specialization links represent subcategories of the category represented by the subject node, while children nodes reached through part links represent part of the object or part represented by the subject node.

The "shouldn't-be-present" attribute provides a switch to indicate whether the part defined by a subject node should or should not be present in the part or object defined by a parent node of the subject node. It is sometimes useful, in distinguishing among similar objects, to include in the description of objects or parts, specific characteristics which they lack. The "shouldn't-be-present" attribute switch allows the descriptions of "disallowed" parts to be distinguished from the descriptions of expected parts. The corresponding value of this attribute is set to 0 or 1 accordingly.

The "has-match-list" attribute provides in its corresponding value a list which summarizes the matching that has been performed between the subject node and either one event or one or more primitives of an event. In contrast with the attributes described above, the corresponding value of this attribute is not set by the user when the AM hierarchy is constructed. Instead, the corresponding value is computed during the symbolic matching step of the matching process described later. Once this processing step is completed, the corresponding value of this attribute can be examined to get a precise understanding of the results of matching.

One match list is computed for each visited node of the AM hierarchy. A match list contains one item for each potential match which is tested during symbolic matching (described later). Each item has the form (degree-of-match  matched-data)

The degree-of-match field is set to a number in the closed range [0,1] indicating how well the matched-data field satisfies the definition of the object or part represented by the node. Increasing values above 0.5 are considered to be increasing degrees of match, while decreasing values below 0.5 are considered to be increasing degrees of mismatch. For property nodes (category and terminal nodes), the aforementioned definition is simply that given the corresponding "has-property-set" attribute. For property nodes which do not have such an attribute, the value of the degree of match field will be 1 for all the elements of the "has-match-list" attribute. For internal nodes of the AM hierarchy tree, the definition includes the parts of the node reached through the a-part-link tree member in the has-downward links attribute of the node and the constraints among those parts contained in the "has constraints" attribute of the node.

Thus, the match list of an AM root node is set twice: first during pruning (described later), when the node is considered as a property node, and then later when the node is treated as an internal node. Of course, the second setting overwrites the first. Keeping this in mind, the "matched-data" field may be either:

1. an event or primitive (if the node is a property node), which is a match to the category, object or part corresponding to this node or 2. a possibly nested list, if the node is an internal node, in which each list element is a match to the part at the corresponding position in the list of immediate parts of this node. The nesting, if any, within a list element will be the same as the nesting of the AM tree rooted at the corresponding part node. Each leaf in these elements will be a match to one of the terminal nodes in this AM tree.

Further, the match list items of the "has-match-list" attribute are always assumed to be sorted by order of non-increasing degree of match.

Examples of list structures for implementing the category node V, Am root node T, and terminal node T-A1 of FIG. 4a are provided in Tables II-IV respectively. The list structures respectively provide complete LISP descriptions of a military vehicle catalog node, the root node of an appearance model for a tank, and a tank antenna AM element node.

TABLE II (an-am-node has-name 'military-vehicle
   has-downward-links
   '(,(a-specialization-link
     has-name 'military-vehicle<->tank)
   ,(a-specialization-link
     has-name 'military-vehicle<->howitzer)
   ,(a-specialization-link
     has-name 'military-vehicle<->apc)))

TABLE III (an-am-node has-name 'tank
   has-upward-links
   '(,(a-specialization-link
     has-name 'military-vehicle<->tank))
   has-downward-links
   '(,(a-part-link has-name 'tank<->tank-antenna-1)
   ,(a-part-link has-name 'tank<->tank-antenna-2)
   ,(a-part-link has-name 'tank<->tank-gun))
   has-constraints
   '(,(a-constraint has-name 'tank-antenna-1-left-of-antenna-2)
   ,(a-constraint has-name 'tank-antenna-1-near-antenna-2)))

TABLE IV an-am-node has-name 'tank-antenna-1
   has-confirming-weight 0.4
   has-disconfirming-weight 1.0
   has-upward-links
   '(,(a-part-link has-name 'tank<->tank-antenna-1))
   has-property-set
   '(((if (object-is a-trus candidate) 1.0 0.0) 0.2)
   ((if (equal has-curvature 'convex) 1.0 0.0) 0.2)
   ((top-of-chain *event* has-cg) 0.2)
   ((fuzzy-and
    (step-plateau has-bisector-angle −110.0 −70.0)
    (ramp-plateau (abs (cadr has-contour-inertia))
    80.0 85.0 95.0 100.0))
   0.2)
   ((falling-ramp (abs (diff 180.0 has-total-ext-angle))
   10.0 45.0) 0.1)
   ((let ((average-length (chain-segment-average-length *event*)))

TABLE IV-continued

```
        (rising-ramp has-total-length
                average-length (times 2.0 average-length)))
    0.1)
    ((let*
            ((inertia-aligned-bounding-rectangle-widths
                (cadr has-contour-widths))
            (max (apply 'max inertia-aligned-bounding-rectangle-widths))
            (min (apply 'min inertia-aligned-bounding-rectangle-widths))
            (max-min-ratio (quotient max (float min)))
            transition)
            (desetq (transition) *antenna-aspect-parameters*)
            (rising-step max-min-ratio transition))
    0.1)
    ((let ((width (cadar has-contour-widths))
            low high)
            (desetq (low high) *antenna-width-parameters*)
            (falling-ramp width low high))
    0.1)
    ((no-primitive-endpoints-at-bottom-of-chain candidate *event*
                                                    0.2 0.5)
    0.1)))
```

A constraint of the AM hierarchy tree is implemented by a list structure (FIG. 5) with the type field set to "a-constraint", and a series of attribute-value fields set as follows.

A "has-name" attribute is listed and its value is the name of the constraint.

A "has-constraint-type" attribute is listed and provides for its corresponding value a symbol indicating the type of the constraint (spatial, size-relational, etc . . . ). This attribute is for documentation purposes only, it is not used in the matching process.

A "has-constrainees" attribute is listed and provides for its corresponding value a list of the members (nodes) of the AM hierarchy tree which are of type "an-am-node". These nodes are the parts involved in the constraint and must be among the immediate parts of the internal node associated with the constraint.

A "has-function" attribute is listed and provides for its corresponding value a function of c arguments where c is the number of part nodes in the has constrainees attribute, and the nth argument is a possible match to the nth part in the has-constrainees list. Each of the arguments will be either:

1. A primitive-description element, if the referenced constrainee node is a terminal node, which is a match to the part corresponding to this constrainee node, or 2. A list, possibly nested, if the referenced constrainee node is an internal node. Each list element is a match to the part at the corresponding position in the list of immediate parts or each constraint node. The nesting, if any within an argument, will be the same as the nesting of the AM tree rooted at the referenced constraining node. Each leaf in these arguments will be a match to one of the terminal nodes in this AM tree.

This function provides a number in the closed range [0,1] indicating the degree to which the given arguments satisfy the constraint which the function defines. This value is called the degree of match for the arguments to the constraint.

A "has-confirming-weight" attribute is listed and has a corresponding value set to a number in the closed range [0,1]. The number indicates the relative importance of the perfect satisfaction of the constraint in confirming the presence of the object or part for which the constraint is defined. At the extremes, a value of 0 indicates that perfect satisfaction of the constraint does nothing to confirm the presence of the object or part for which the constraint is defined, while the value of 1 indicates that perfect satisfaction of the constraint absolutely confirms the presence of the object or part for which it is defined. Confirming weights are denoted by CW in FIG. 3c.

A "has-disconfirming-weight" attribute is listed and has a corresponding value set to a number in the closed range [0,1]. The number indicates the relative importance of the total failure to satisfy the constraint in disconfirming the presence of the object or part for which the constraint is defined. At the extremes, a value of 0 indicates that the total failure to satisfy the constraint does nothing to disconfirm the presence of the object or part for which the constraint is defined (i.e. the constraint is optional). A value of 1 indicates that the total failure to satisfy the constraint absolutely disconfirms the presence of the object or part for which the constraint is defined (i.e. the constraint must absolutely be satisfied). Disconfirming weights are denoted by DW in FIG. 3c.

A "shouldn't-be-present" attribute provides a switch indicating whether the constraint should or should not be satisfied. The corresponding value of this attribute is set to 0 or 1 (or, True or False) accordingly.

A "has-match-list" attribute provides a match list which summarizes the matching that has been performed between the constraint and some combinations of one or more primitives. In contrast with the attributes described above, the value of this attribute is not set by the user when the AM hierarchy is constructed. Instead, the corresponding value of the attribute is computed during the symbolic-matching step of the matching process described later. Once this processing step is completed, the corresponding value of this attribute can be examined to get a precise understanding of the matching process. There is one item in the match list for each combination of arguments to which the constraint function specified by the has-function attribute was applied during symbolic matching. Each of these items has the form (degree of match   matched-data)

The degree-of-match field is a number in the closed range [0.1] produced by the constraint function when applied to the elements of the matched-data field. The form of these elements is as described above for the "has-function" attribute. Also the items of the match list of this attribute are always assumed to be sorted by order of non increasing degree of match.

Table V provides an example of a list structure for implementing the constraint node L in the AM hierarchy of FIG. 4a. This list structure provides a complete LISP description of the constraint "left of".

TABLE V

```
(a-constraint has-name 'tank-antenna-1-left-of-antenna-2
    has-constraint-type 'spatial
    has-confirming-weight 1.0
    has-disconfirming-weight 0.0
    has-constrainees '(,(an-am-node has-name 'tank-antenna-1)
                       ,(an-am-node has-name 'tank-antenna-2))
    has-function
    '(lambda (antenna-1 antenna-2)
        (if (left-of (has-cg antenna-1)
                     (has-cg antenna-2))
            1.0 0.0)))
```

Branches which point to a category node in the AM hierarchy are implemented by a list structure (FIG. 5) with the type field set to "a-specialization-link". Such branches are used to link the an-am-node members in the category hierarchy of an AM hierarchy tree. A-specialization-link members are referenced in the "has-upward-links" and "has-downward-links" attributes of an-am-node members of the AM hierarchy tree. Hence, a category node is linked to its subcategory nodes via a-specialization-link members in its has-downward-links attribute. A category node is linked to the higher-category node (parent) that contain it via a-specialization-link member in its has-upward-links attribute.

The attributes of the specialization link are as follows. A "has-name" attribute has a corresponding value which indicates the name of the link. A "has-specialization" attribute has a corresponding value which indicates the an-am-node member which is of the lower category in the relationship represented by the a-specialization-link member. A "is specialization-of" attribute has a corresponding value which indicates the an-am-node member which is of the higher category in the relationship represented by the a-specialization-link member.

Table VI provides an example of the list structure for implementing the specialization link V-T in the AM hierarchy tree of FIG. 4a. The list structure provides a complete LISP description of the branch from node V to node T in FIG. 4a.

TABLE VI

```
(a-specialization-link has-name 'military-vehicle<->tank
    has-specialization (an-am-node has-name 'tank)
    is-specialization-of
    (an-am-node has-name 'military-vehicle))
```

Branches in the AM hierarchy tree that define relationships between pairs of nodes of an AM tree are implemented by a list structure (FIG. 5) with a type set to "a-part-link". Hence, a-part link member is used to link the an-am-node members found in AMs. A-part-link members are referenced in the "has-upward-links" and "has-downward-links" attributes of an-am-node members. Thus, an internal node is linked to its part nodes via a-part link member in its has-downward-links attribute. A part node is linked to the internal (parent) node that contains it via an a part link member in its has-upward-links attribute. In the case of an AM element node, the has-upward-link attribute must have exactly one element because of the restrictions imposed on the node configurations described previously.

The attributes for a "part-link" type list structure are as follows. A "has-name" attribute provides in its corresponding value the name of the link. A "has-part" attribute provides in its corresponding value the name of the an-am-node member that is the child node in the relationship represented by the a-part-link member. A "is part-of" attribute provides in its corresponding value the name of an an-am-node member that is the parent node of the child node in the relationship represented by the a-part-link object.

Table VII provides an example of a list structure for implementing the part link T-TA1 in the AM hierarchy tree of FIG. 4a. The list structure provides a complete LISP description of the AM tree branch from node T to node TA1.

TABLE VII

```
(a-part-link has-name 'tank<->tank-antenna-1
    has-part (an-am-node has-name 'tank-antenna-1)
    is-part-of (an-am-node has-name 'tank))
```

Other design considerations and details of the AM hierarchy or a model library and the event characterization module of FIGS. 1 and 2 are provided in "Automatic object recognition from range imagery using appearance models", by J. G. Verly et al., *Proceedings of the Computer Society Workshop on Computer Vision*, IEEE, Miami Beach, Fla., pages 244-246, Nov. 30-- Dec. 2, 1987; "An experimental target recognition system for laser-radar imagery", by D. E. Dudgeon et al., *Proceedings of the DARPA Image Understanding Workshop*, DARPA, Hyatt Rickeys, Palo Alto, Calif. pages 479-506, May 23-26, 1989.

The matching module 12 of FIGS. 1 and 2 operates in three steps referred to as symbolic matching 56, evidential processing 58 and match selection 60 as illustrated in FIG. 6 and described next.

The first step (symbolic matching 56) consists of two phases, pruning and AM-matching. The input to this first step 56 consists of an event, a list of primitives derived from that event, and an AM hierarchy, as described in FIGS. 4a and 4b, from the model library. In the pruning phase, the input event is matched against the property sets of the category nodes of the input AM hierarchy tree. This matching of the event against the node of the category hierarchy of the input tree is carried out in a depth first manner beginning at the root of the AM hierarchy tree. At each node, the input event is matched against the property set of the node, a degree of match is computed, and the "has-match-list" attribute of the node is set accordingly. If this degree of match is greater than a globally defined match threshold, then the depth first matching continues recursively with the subcategories of the node.

If the degree of the match is not above the match threshold, then the input is considered to characterize an entity that belongs neither to the category defined by the node nor to any of the sub-categories of the node. As a result, the depth first matching is terminated in this branch of the of the AM hierarchy.

As a result, this recursive matching procedure collects those "terminal" nodes of the category hierarchy (i.e. root nodes of AMs in the AM hierarchy tree) that it reaches and determines to have a degree of match greater than the match threshold. The effect of the pruning phase is thus to collect a set of AMs for objects whose high level descriptions match the input event. The AMs that are collected in this way are called active AMs (their roots are referred to as the active object label nodes).

A degree of match $m_\alpha$ between the property set $p_\alpha$ of a category or terminal node $\alpha$ and an input event or primitive thereof is determined by the relationship $$m_\alpha(\bar{x}_\alpha) = \begin{cases} 1 & \text{if } p_\alpha \text{ is empty} \\ 0 & \text{if } f_{\alpha,k}(\bar{x}_\alpha) = 0 \text{ for some } k \\ \dfrac{\sum_k w_{\alpha,k} f_{\alpha,k}(\bar{x}_\alpha)}{\sum_k w_{\alpha,k}} & \text{otherwise} \end{cases} \quad \text{Equation 1}$$

where $\bar{x}_\alpha$ is the matched data vector which corresponds to some matched data for the category or terminal node $\alpha$ and has only one component, either an event primitive (for a terminal node) or an event (for a category node);

$w_{\alpha,k}$ is the kth property weight defined in the has-property-set attribute of the node $\alpha$;

$f_\alpha$ is the kth property function defined in the has-property-set attribute of the node $\alpha$; and k is the number of elements (i.e. property function-property weight pairs) in the list of the has-property-set attribute of the node $\alpha$.

The only requirements on the values of the individual property weights are (i) that they be non-negative and (ii) that the sum of all of the property weights be non-zero to avoid division by 0 in Equation 1. Although not required, it is preferred to select weights in the closed range [0,19 , but without attempting to force their sum to equal unity since this would be inconvenient.

The property functions are examined one at a time in the order of increasing indices k. This examination stops as soon as one of the property functions produces a value of 0. This approach allows some of the subsequent property functions to be easier to formulate since one can assume that the subsequent property functions will never be considered under unexpected circumstances. A simple example of such is the case of a property function producing a value of 0 when some quantity a is 0. In that case, one does not need to worry about dividing by a (i.e. 0) in subsequent property functions. This feature is also useful for avoiding useless computations.

Because of the above constraints on the property weights and their sums, and the fact that each property function produces numbers in the closed range [0,1], the degree of match $m_\alpha$ will always be in the closed range [0,1].

Further, the "has-match-list" attribute is a list of matches, where each match contains both a degree of match and some matched data. Hence, to set the "has-match-list" attribute both a degree of match and matched data must be calculated. Generally, the matched data is a complete representation of the relationship between terminal nodes and event primitives, category nodes and data events, internal nodes and a fixed ordering of parts under the node, or constraints and a fixed ordering of constrainees of the constraint.

Specifically in the case of a terminal node, matched data is an event primitive matched to the terminal node. In the case of a category node matched data is a data event matched to the category node. All valid combinations of items that are matched to the parts of an internal node under consideration or to the constrainee parts of the constraint of interest are referred to as matched data for an internal node or constraint. Thus, in the case of an internal node or constraint the term "matched data" refers to a collection of event primitives paired with the constituent terminal nodes and organized in a structure dictated by the shape of the sub-tree rooted by the internal node of interest or by the internal node associated with the constraint of interest where each constraint is associated with a specific internal node.

As used in later calculations, a matched data vector $\bar{x}_\gamma$ corresponding to some matched data for an internal node $\gamma$ is the vector whose ith component is equal to the ith element of the matched data of interest. Thus for an internal node, the matched data vector is simply a vector representation of the corresponding matched data list. This definition implies some fixed ordering of the parts of an internal node which is specified in the has-downward-links attribute of the an-am-node structure representing internal node $\gamma$. It is noted that during the matching process described later, the object label nodes are first treated as category nodes and then as internal nodes. Therefore, the definition of the matched data vector for such nodes depends upon the context.

In the case of a constraint, given some matched data vector $\bar{x}_\gamma$ for an internal node $\gamma$ that has C as a constraint, the matched data vector $\bar{c}_C$ is the vector whose ith component is equal to the element of $\bar{x}_\gamma$ corresponding to the ith constrainee node of C. Here also this definition presupposes a fixed ordering for the constrainees of C, which is implicitly given by the has-constrainees attribute of the a-constraint structure representing C.

The relation between $\bar{x}_C$ and $\bar{x}_\gamma$ is best formulized through the vector matrix relation $\bar{x}_C = M_{C,\gamma} \bar{x}_\gamma$ where the element (i,j) of the matrix $M_{C,\gamma}$ is 1 if the ith constrainee of $\alpha$ is the jth part of $\gamma$ and 0 otherwise. The correspondence between the constrainees of C and the parts of $\gamma$ is easily established by examining the has-name attributes of the an-am-node structure involved.

It is important to realize that in the case of a constraint the matched vector is more than just the equivalent of the matched data list. Indeed with the above definition, it is possible that some of the elements of $\bar{x}_C$ to be nil indicating an absence of match to the corresponding constrainee. This must be contrasted with the fact that the elements of a matched data list for a constraint can never be nil. Note that for an internal node nil elements can occur both in the matched data vector and in the matched data list.

In the AM matching phase of the symbolic matching step 56 (FIG. 6), the input primitives that characterize the decomposed input data event are matched against the active AMs. The matching is carried out independently for each active AM by applying the following depth first recursive matching procedure to the root node of the AM.

If the current node is a terminal node, then a degree of match is computed for the match of each input primitive to the property set of the node. The degree of match $m_\alpha (\bar{x}_\alpha)$ of the matched data vector $\bar{x}_\alpha$ which contains the input primitive matched to terminal node $\alpha$ is computed according to Equation 1 described above.

If the current node is not a terminal node, then it must be an internal node. In this case, the matching involves three steps:

a) The input primitives are matched against each of the children nodes (parts) of the internal node in turn by recursively applying this AM matching procedure to each individual part. After doing this, each part and constraint defined beneath the internal node has its "has-match-list" attribute set.

b) Each constraint defined in the "has-constraints" attribute of the current internal node is applied to each of the elements of a cartesian product of matched data for that constraint. To obtain the cartesian product of match data for a constraint, the match list of each constrainee (child node) of the constraint (parent node) is reviewed for matches above a global matched threshold. From those matches above the threshold in a constrainee match list, a corresponding auxiliary or truncated list of matched data is constructed. This is performed for each constrainee. Then a classical cartesian product of the auxiliary lists of matched data of the constraining nodes is computed according to the following definition of cartesian product.

The cartesian product $A_1 \times \ldots \times A_n$ of n sets $A_i$ is the set of all ordered sets $(a_1, \ldots, a_n)$ with $a_i$ an element of $A_i$.

In the resulting product (a list of combinations of matched data from the constraining nodes) the combinations in which the same primitive appears more than once are removed. In the preferred embodiment, the cartesian product of the auxiliary lists of matched data of the constraining nodes is performed by first considering the partial product for the first two constrainee nodes and removing product combinations with duplicated primitives. The cartesian product of this intermediate result and the auxiliary list of matched data for the third constrainee node is then computed. The resulting product combinations with duplicate primitives are removed and so on. The final result is the list of combinations of matches from the constrainee nodes with no combination having a repeating primitive.

Next a degree of match $m_C$ for each combination is calculated. Each constraint is characterized by a constraint function $f_C(\bar{x}_C)$ whose argument $\bar{x}_C$ is the matched data vector corresponding to some matched data vector $\bar{x}_\gamma$ for the internal node $\gamma$ to which constraint C belongs. The degree to which a matched data vector $\bar{x}_C$ satisfies the constraint function $f_C$ of a constraint C is also called a degree of match and is defined $$m_C(\bar{x}_C) = f_C(\bar{x}_C)$$

provided C is an active constraint with respect to $x_\gamma$, i.e. constraint C is an element of the set of active constraints of internal node $\gamma$.

Upon accomplishing the above, each constraint associated with the internal node has its "has-match-list" attribute set.

(c) The cartesian product of matched data for the current internal node is computed in a manner similar to that described above for constraints. That is, an auxiliary (truncated) matched list is constructed for each child node of the internal node. A value "nil" is appended to the end of each auxiliary list. The cartesian product of the resulting auxiliary lists is calculated according to the previously stated definition of cartesian product. From the resulting product list, combinations with a repetitive primitive are removed. Combinations with repetitive nils are allowed to remain in the product list.

Each matched data combination in the final product list, for example (p1 nil p3 p5), is a list reflecting the fact that the internal node has four parts, with primitive p1 matched to the first part, nil to the second, (i.e. no match). and so on. Hence, the ordering of the combination elements is important and that each position in the combination list corresponds to a unique part of the internal node. Furthermore, each element in the combination list is also one of the matched data of the corresponding parts, e.g. primitive p1 is one of the matched data of a child node of the example internal node.

Next, a degree of match is obtained for each of the combinations in the resulting product list. The existence of inactive parts and constraints makes the computation of the degree of match for a given internal node $\gamma$ and matched data vector $\bar{x}_\gamma$ more complicated. In the case of an internal node $\gamma$ whose parts are all terminal nodes, each active part or constraint of $\gamma$ is characterized by a degree of match $m_\alpha$ and by a (normalized) degree of confidence $c_\alpha(\bar{x}_\alpha)$, where $\bar{x}_\alpha$ is the matched data approximately extracted from $\bar{x}_\gamma$ for the $\alpha$ of interest.

The degree of confidence $c_\alpha$ for a terminal node or a constraint is chosen to be a linear function of the corresponding degree of match as follows.

$$c_\alpha(m_\alpha) = \delta_\alpha(2m_\alpha - 1)$$

where where $\delta_\alpha = \begin{cases} -1 & \text{if } \alpha \text{ is a node or constraint that should not be present;} \\ +1 & \text{if } \alpha \text{ is a node or constraint that should be present.} \end{cases}$ The transformation provided by this equation is a mapping from a range [0,1] to a range of [−1,+1]. For $\delta_\alpha = +1$, increasing values of $c_\alpha$ above 0 correspond to increasing confidence that one has a good part-to-primitive match or a good constraint satisfaction between parts. Decreasing values below 0 correspond to increasing doubt about the presence of the part or the satisfaction of the constraint. In that case, a degree of match of 0.5 can be viewed as a neutral degree of match since it corresponds to a degree of confidence of 0.

The next step is to decide what to do with the parts and constraints that are inactive for matched data $\bar{x}_\gamma$ of interest. The present invention provides two options which can be selected through a switch named "penalty". If the value of this switch is zero, then the degree of confidence $c_\alpha$ is replaced by 0, thereby insuring that any inactive element has no effect on subsequent processing steps. For penalty switch values that are non-zero, $c_\alpha$ is replaced by the degree of confidence corresponding either to a maximum doubt (−1 if the shouldnt-be-present attribute of $\alpha$ indicates that $\alpha$ should be present) or to a maximum confidence (+1 if the same The effective degree of confidence $c_\alpha^*(\bar{x}_\alpha)$ for any part or constraint $\alpha$ of an arbitrary internal node $\gamma$ and for any $\bar{x}_\gamma$ matched to $\gamma$ is given by $c^*_\alpha(\bar{x}_\alpha) = c_\alpha(\bar{x}_\alpha)$ if $\alpha$ is an element of the set of active parts and active constraints of node $\gamma$;
0 if $\alpha$ is an element of the set of inactive parts and inactive constraints of node $\gamma$ and penalty = 0;
$-\delta_\alpha$ if $\alpha$ is an element of the set of inactive parts and inactive constraints of node $\gamma$ and penalty $\neq$ -continued

0.

In summary, the introduction of the effective degree of confidence $c_\alpha^*(\bar{x}_\alpha)$ guarantees that a quantity equivalent to the normalized degree of confidence (which can only be computed for active $\alpha$'s) exists for any part or constraint of $\gamma$ whether active or inactive.

A key step toward the calculations of the degree of match of an arbitrary internal node $\gamma$ is the calculation of the rating of each $\alpha$ that is an element of the parts and constraints for internal node $\gamma$ and some matched data $\bar{x}_\gamma$ corresponding to $\gamma$. The rating will be denoted by $r_\alpha(\bar{x}_\alpha)$ and is defined by $$r_\alpha(\bar{x}_\alpha) = w_\alpha(c_\alpha^*(\bar{x}_\alpha)) c_\alpha^*(\bar{x}_\alpha),$$

where $$w_\alpha(c^*) = \begin{cases} W_{c,\alpha} & \text{if } c^* \text{ is greater than 0} \\ W_{d,\alpha} & \text{if } c^* \text{ is less than or equal to 0.} \end{cases}$$

And where $W_{c,\alpha}$ and $W_{d,\alpha}$ are the values of "has-confirming-weight" and "has-disconfirming-weight" attributes of the "an-am-node" or "a-constraint" member corresponding to $\alpha$ (parts or constraints of internal node $\gamma$).

The function $w_\alpha$ has the effect of scaling a "confidence" by the confirming weight of $\alpha$ and a "doubt" by its disconfirming weight.

A more explicit form for the rating is thus as follows:

Equation 2
$$r_\alpha(\bar{x}_\alpha) = \begin{cases} W_{c,\alpha} c_\alpha(\bar{x}_\alpha) & \text{if } \alpha \text{ is an element of the set of active parts and constraints of } \gamma \text{ and } c_\alpha \geq 0 \\ W_{d,\alpha} c_\alpha(\bar{x}_\alpha) & \text{if } \alpha \text{ is an element of the set of active parts and constraints of } \gamma \text{ and } c_\alpha < 0 \\ 0 & \text{if } \alpha \text{ is an element of the set of inactive parts and constraints of } \gamma \text{ and penalty} = 0 \\ W_{c,\alpha} & \text{if } \alpha \text{ is an element of the set of inactive parts and constraints of } \gamma, \text{ penalty} \neq 0, \text{ and } \delta_\alpha = -1 \\ -W_{d,\alpha} & \text{if } \alpha \text{ is an element of the set of inactive parts and constraints of } \gamma, \text{ penalty} \neq 0, \text{ and } \delta_\alpha = +1. \end{cases}$$

The ratings $r_\alpha$ of all $\alpha$'s in the set of parts and constraints of an internal node $\gamma$ are combined into a single number $c'_\gamma$ called the total degree of confidence of node $\gamma$. In the case where all the parts and constraints of node $\gamma$ are active, $c'_\gamma$ is defined as the sum of the ratings $r_\alpha$ for all $\alpha$ in the set of parts and constraints of the node $\gamma$, i.e.

$$c'_\gamma = \Sigma r_\alpha$$

where $\alpha$ is in the set of parts and constraints of the node $\gamma$. The minimum (maximum) value of $c'_\gamma$ is achieved when all the degrees of confidence $c_\alpha$ have their minimum (maximum) values of $-1 (+1)$. Hence, $$c'_{\gamma,min} = -\Sigma W_{d,\alpha} \text{ and}$$

$$c'_{\gamma,max} = \Sigma W_{c,\alpha}$$

where $\alpha$ is in the set of parts and constraints of the node $\gamma$.

In the case where some node or constraint $\alpha_1$ has a rating of $+1$ and some other node or constraint $\alpha_2$ has a rating of $-1$ then there is a conflict since $\alpha_1$ absolutely confirms the presence of $\gamma$ and $\alpha_2$ absolutely disconfirms the presence of $\gamma$. If this situation occurs, then the AM matching phase sets an error flag.

In the case where some node $\alpha$ has a rating of $+1$, $c'_\gamma$ (the total degree of confidence of node $\gamma$) is set equal to its maximum value as defined above, to absolutely confirm the presence of node $\gamma$.

In the case where some node $\alpha$ has a rating of $-1$, $c'_\gamma$ is set equal to its minimum value as defined above, to absolutely disconfirm the presence of node $\gamma$.

In all other cases (i.e. when none of the ratings are equal to either $+1$ or $-1$), the ratings of all elements $\alpha$ in the set of parts of node $\gamma$ and active constraints of node $\gamma$ are added, while those for inactive constraints are taken into account in the following fashion.

a) Where the switch "penalty" equals 0 then a loss of confidence, $L(\bar{x}_\gamma)$, is set to 0 and the inactive constraints are ignored (i.e. the ratings of the inactive constraints are not incorporated into the foregoing sum).

b) Where "penalty"=1, L is set to the sum of the ratings of all inactive constraints, i.e.

$$L(\bar{x}_\gamma) = \Sigma r_\alpha(\bar{x}_\alpha)$$

where $\alpha$ is in the set of inactive constraints of node $\gamma$.

c) In the case where "penalty"=2, each inactive part p of $\gamma$ that is also a constrainee of some constraint of $\gamma$ is determined, and a set of inactive constraints that include p among their constrainees is formed. The average of the ratings for the inactive constraints in the formed set is computed. And L is set equal to the sum of these averages over all inactive part p's. Hence, $$L(\bar{x}_\gamma) = \sum_{p \in P'_{i,\gamma}} /C^p_{i,\gamma}/^{-1} \sum_{\alpha \in C^p_{i,\gamma}} r_\alpha(\bar{x}_\alpha)$$

where $P'_{i,\gamma}$ is the set of inactive parts that are also constrainees of inactive constraints of $\gamma$;

$C_{i,\gamma}^p$ is the set of inactive constraints of $\gamma$ that have node p as a constrainee; and $/C_{i,\gamma}^p/$ is the number of inactive constraints having p as a constrainee.

d) In the case where "penalty"=3, each inactive part of p of $\gamma$ that is also a constrainee of some constraint of $\gamma$ is determined. And a set of inactive constraints that include p among their constrainees is established. The rating of the inactive constraint that ranks highest in the formed set in terms of the absolute value of its rating is obtained. L is set to the sum of the "minimum" ratings of inactive constraints over all p's Hence, $$L(\bar{x}_\gamma) = \sum_{p \in P'_{i,\gamma}} \min_{\alpha \in C^p_{i,\gamma}} r_\alpha(\bar{x}_\alpha)$$

Of course, the first of the foregoing cases is the simplest to implement. If the second case is selected, then the total degree of confidence $c'_\gamma$ is effectively equal to the sum of the ratings for all the parts and constraints of the internal node of interest. The problem with this case is that one unmatched constrainee may be referenced by several constraints, resulting in a disproportionately high loss of confidence. The last two cases ("penalty" values of 2 or 3) set forth above are provided to eliminate this problem when necessary. It is understood that these last two cases are not the only ones possible. For example, the median of the ratings instead of their mean may be used.

In summary, the total degree of confidence $c'_\gamma$ of any internal node $\gamma$ is given by the following general formula $$c'(\bar{x}_\gamma) = \begin{cases} \text{"error"} & \text{if there exists } a_1 \epsilon PC_\gamma \text{ with } r_{a1}(\bar{x}_{a1}) = +1 \\ & \text{and there exists } a_2 \epsilon PC_\gamma \text{ with } r_{a2}(\bar{x}_{a2}) = -1 \\ c'_{\gamma,max} & \text{if there exists } a \epsilon PC_\gamma \text{ with } r_a(\bar{x}_a) = 1 \\ c'_{\gamma,min} & \text{if there exists } a \epsilon PC_\gamma \text{ with } r_a(\bar{x}_a) = -1 \\ \Sigma\, r_a(\bar{x}_a) + L(\bar{x}_\gamma) & \text{otherwise} \\ a \epsilon P_\gamma U C_{a,\gamma} \end{cases} \quad \text{Equation 3}$$

where $r_a$ is defined in Equation 2;
$PC_\gamma$ is the set of parts and constraints of $\gamma$; and
$P_\gamma \cup C_{a,\gamma}$ is the set of parts of $\gamma$ and active constraints of $\gamma$.

A degree of match $m_\gamma$ for internal node $\gamma$ with a total degree of confidence $c'_\gamma$ is then defined as $$m_\gamma(c'_\gamma) = \frac{c'_\gamma - c'_{\gamma,min}}{c'_{\gamma,max} - c'_{\gamma,min}} \quad \text{Equation 4}$$

Further, a neutral degree of match $n_\gamma$ of an internal node $\gamma$ is defined as the degree of match which corresponds to a total degree of confidence of zero. Hence, $$n_\gamma = \frac{-c'_{\gamma,min}}{c'_{\gamma,max} - c'_{\gamma,min}}$$

The present invention uses a value of 0.5 for the neutral degree of match of a terminal node or constraint. Then for any terminal node, constraint or internal node $a$, the normalized degree of confidence $c_a$ for a neutral degree of match $n_a$ is $$c_a(m_a, n_a) = \begin{cases} \delta_a \dfrac{m_a - n_a}{1 - n_a} & \text{if } m_a > n_a \\ \delta_a \dfrac{m_a - n_a}{n_a} & \text{if } m_a \leq n_a \end{cases} \quad \text{Equation 5}$$

where $$n_a = \begin{cases} 0.5 & \text{if } a \text{ is a terminal node or constraint;} \\ \dfrac{-c'_{a,min}}{c'_{a,max} - c'_{a,min}} & \text{if } a \text{ is an internal node} \end{cases}$$

and $m_a$ is the degree of match of $a$.

After calculating the degree of match for each combination in the product list, in the case of an internal node in the AM matching step (FIG. 6). the "has-match-list" attribute of the internal node of interest is set.

Upon the foregoing recursive matching in the AM matching phase of the symbolic matching step 56 being completed, each part and constraint of each active AM has its "has-match-list" attribute correctly set.

Referring back to FIG. 6, the evidential processing step 58 follows the symbolic matching step 56. The evidential processing step 58 uses the list of active object-label nodes (active AM root nodes) and the match lists (i.e. the resulting cartesian product list with degrees of match for each combination in the list) generated in the symbolic matching step 56 and stored in the appropriate attribute for each node. The evidential processing step 58 is formed of an evidence collection phase and an evidence combination phase described next.

In the evidence collection phase, the evidence for or against the various active object label nodes is collected. For object label node o, the match list element that has the highest degree of match is selected as the best possible match of primitives to the terminal children nodes of o. Given this particular combination of primitive-to-terminal-part matches, the corresponding matches of combination of matches to the immediate parts and constraints of o are regarded as candidate pieces of evidence to either confirm or disconfirm an object-label hypothesis for o.

In particular, elements are deemed to constitute a piece of evidence for or against an object-label node o that has survived pruning and whose best match (i.e. the first element in its has-match-list attribute) has $\bar{x}^*_o$ as its matched data vector if:

a) there exists a match to any part or active constraint $a$ of $o$, such that its matched-data vector $\bar{x}_a$ corresponds to $\bar{x}^*_o$, and its rating $r_a(\bar{x}_a)$ is non-zero; or b) for "penalty" $=0$, there exists a match to any inactive constraint $a$ of $o$ under the same conditions as (a) above; or c) for "penalty" $=2$ or 3, there exists a collection of matches to all inactive constraints $a$ sharing some inactive constrainee, such that their matched-data vectors $\bar{x}_a$ correspond to $\bar{x}^*_o$, and their combined rating is non-zero. The combined rating for "penalty" $=2$ is defined to be the average of the ratings of the inactive constraints sharing a common inactive constrainee. The combined rating for "penalty" $=3$ is defined as the minimum of the ratings of the inactive constraints sharing a common inactive constrainee.

It is noted that there are no pieces of evidence for object-label nodes eliminated by pruning. Further, any piece of evidence with a zero rating (regular or combined) is eliminated from further consideration. Then, a piece of evidence with a positive rating constitutes a piece of confirming evidence, while a piece of evidence with a negative rating constitutes a piece of disconfirming evidence.

The degree of support provided by a piece of evidence for object-label node o is the absolute value of either the ratings of the corresponding match or the combined rating of the corresponding collection of matches. The focal element of this support is either the singleton $\{o\}$ in the power set (the set of all subsets) of the frame of discernment $\Theta$ (set of all possible outcomes) if $a$ is a piece of confirming evidence, or the set that is the complement of o with respect to $\Theta$ if $a$ is a disconfirming piece of evidence. Note that the frame of discernment $\Theta$ consists only of the active object-label nodes and the label "none".

It is emphasized that the use of ratings in the evidence-collection process is very similar to their use in the calculation of total degree of confidence for an internal node described earlier. The same ratings that are added to compute the total degree of confidence are used to assign degrees of support to the subsets of the frame of discernment Θ. In both cases, the same "penalty" switch dictates the details of the operations to be performed. Any given value of the switch leads to similar actions in the case of degree of confidence and in the case of the degree of support. Further, the ratings or combined ratings for all candidate pieces of evidence are conveniently computed from the degrees of match already obtained during the symbolic matching step 56 and stored in the match list of respective nodes.

In the evidence-combination phase of the evidential processing step, for each piece of evidence, the associated rating determined in the evidence collection phase is used to define a simple support belief function of the Dempster-Shafer theory of evidence with appropriate support and focus to represent the piece of evidence. In the present invention, the simple support belief function has the form:

$$m(A) = \begin{cases} s & \text{if } A = X \\ 1 - s & \text{if } A = \theta \\ 0 & \text{otherwise,} \end{cases}$$

where

A is a subset of Θ the set of all possible outcomes/labels;

m (A) is the basic probability number which measures the belief that is committed exactly to A;

X is the singleton corresponding to some active object-label node and referred to as the focus of the belief function; and s is the degree of support assigned to X in the collection of evidence phase;

X is the singleton corresponding to some active object-label node and referred to as the focus of the belief function; and 1−s is the balance or amount of ignorance assigned to Θ.

The overall basic probability assignment function corresponding to the aggregation of all pieces of evidence is determined by a combination of the bpn's m(A) defined for all the pieces of evidence according to Dempster's rule of combination described in "A Mathematical Theory of Evidence", by Glenn Shafer, *Princeton University Press*, Princeton, N.J., 1976 and in "The Dempster-Shafer theory of evidence", by Jean Gordon and Edward H. Shortliffe, *Ruled-based Expert Systems*, Addison-Wesley, Bruce C. Buchanan and Edward H. Shortliffe, editors, Chapter 13, pages 272–292, Reading Mass., 1985.

More precisely, each element of the frame of discernment Θ corresponds either to the object-label hypothesis "The event and primitives under consideration correspond to the object o", where o is one of the object label nodes of the input AM hierarchy tree, or to the null hypothesis "The event and primitives under consideration do not correspond to any of the objects described in the AM hierarchy". Dempster's rule combines the simple support functions representing the pieces of evidence collected from the appropriate parts and constraints of the object-label nodes by using a succession of orthogonal sums $m_1 \oplus m_2$ of two basic probability assignments $m_1$ and $m_2$, one each from two of the simple support functions. The orthogonal sum $m_1 \oplus m_2$ of two basic probability assignments $m_1$ and $m_2$ is given by $$m_1 \oplus m_2(A) = \begin{cases} 0 & \text{If } A = \theta \\ \text{"undefined"} & \text{if } \Sigma_{BC=\theta} m_1(B)m_2(C) = 0 \\ \frac{\Sigma_{BC=A} m_1(B)m_2(C)}{\Sigma_{BC=\theta} m_1(B)m_2(C)} & \text{otherwise.} \end{cases} \quad \text{Equation 6}$$

where A is a singleton of θ; and B and C are subsets of θ.

The overall basic probability assignment function (or belief function) produced by the evidential processing step 58 (FIG. 6) is input to the third step of the matching module, the matched selection step 60. The matched selection step 60 summarizes the aggregated evidence as follows.

The overall basic probability assignment constructed in the evidential processing step 58 forms the basis of a selection rule that determines which if any of the object labels in the input AM hierarchy is the correct label for the data event and event primitives under consideration. The present invention employs a selection rule which looks at the belief associated with each of the singletons in the overall basic probability assignment function (where each singleton is associated with one specific object label hypothesis). The singleton, and thus the object-label hypothesis, with the highest belief is selected. Since one of the object-label hypothesis is the null hypothesis, it is possible that the input event will be declared an unknown object. Otherwise, the image event will be declared to be an object corresponding to one of the object-label nodes of the input AM hierarchy tree. Since the belief or degree of belief associated with each singleton is simply equal to the basic probability number that appears in the overall basic probability assignment function computed in the evidential processing step 58, no calculation is required to go from the basic probability numbers to degrees of belief. In spite of this, it is useful to view the selection as being based on degrees of belief, since these are the quantities to consider for more complex rules used in the alternative.

The simple selection rule described above is very effective in practice. However, the Dempster-Shafer formalism naturally lends itself to the formulation of more complex selection rules. For instance, in some cases the best answer for a given matching problem might correspond to a disjunction of two or more object label hypothesis, e.g. "the event being analyzed corresponds to either object $O_1$ or object $O_2$". The Dempster-Shafer formalism makes the implementation of such a selection rule straightforward. Other enhancements to the present invention include such improvements of the selection rule. As pointed out above, the quantities to be considered to rank the various hypotheses are the corresponding degrees of belief. In this more general case, the basic probability numbers and degrees of belief are not equal and the necessary degrees of belief must be computed from the basic probability assignment produced by the evidential processing step 58. The formula for computing the degree of belief Bel(A) for a subset A of θ is Bel(A)=Σm(B), where the sum is on all subsets B included in A.

Hence, the matched selection step 60 provides an output of either one of the active object labels in the input AM hierarchy or the label "none", together with the corresponding degree of belief.

Software Support

Figure 7A:
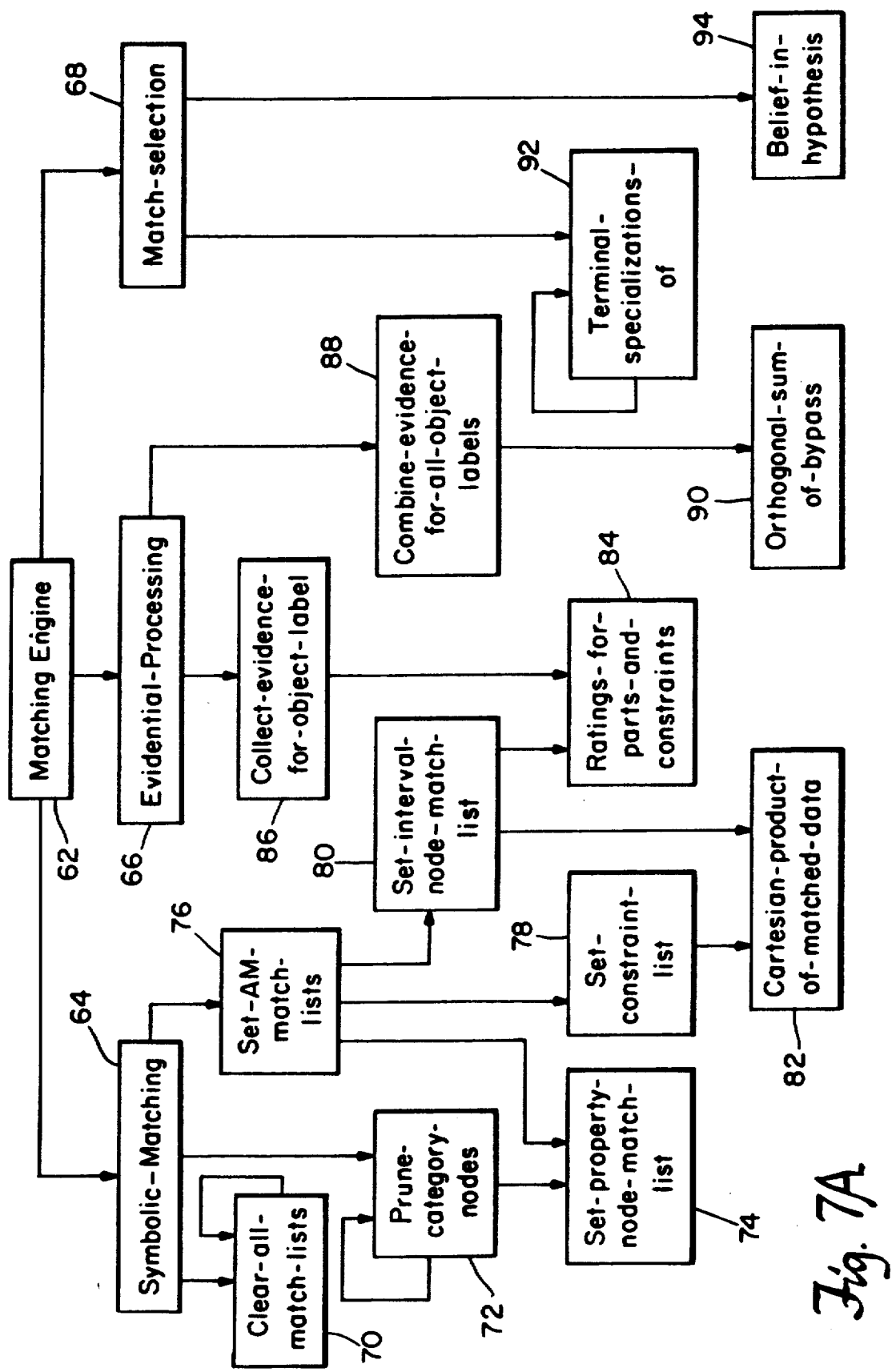
FIGS. 7a-7b diagrams of software programs implementing the matching module of FIG. 6.
Figure 7B:
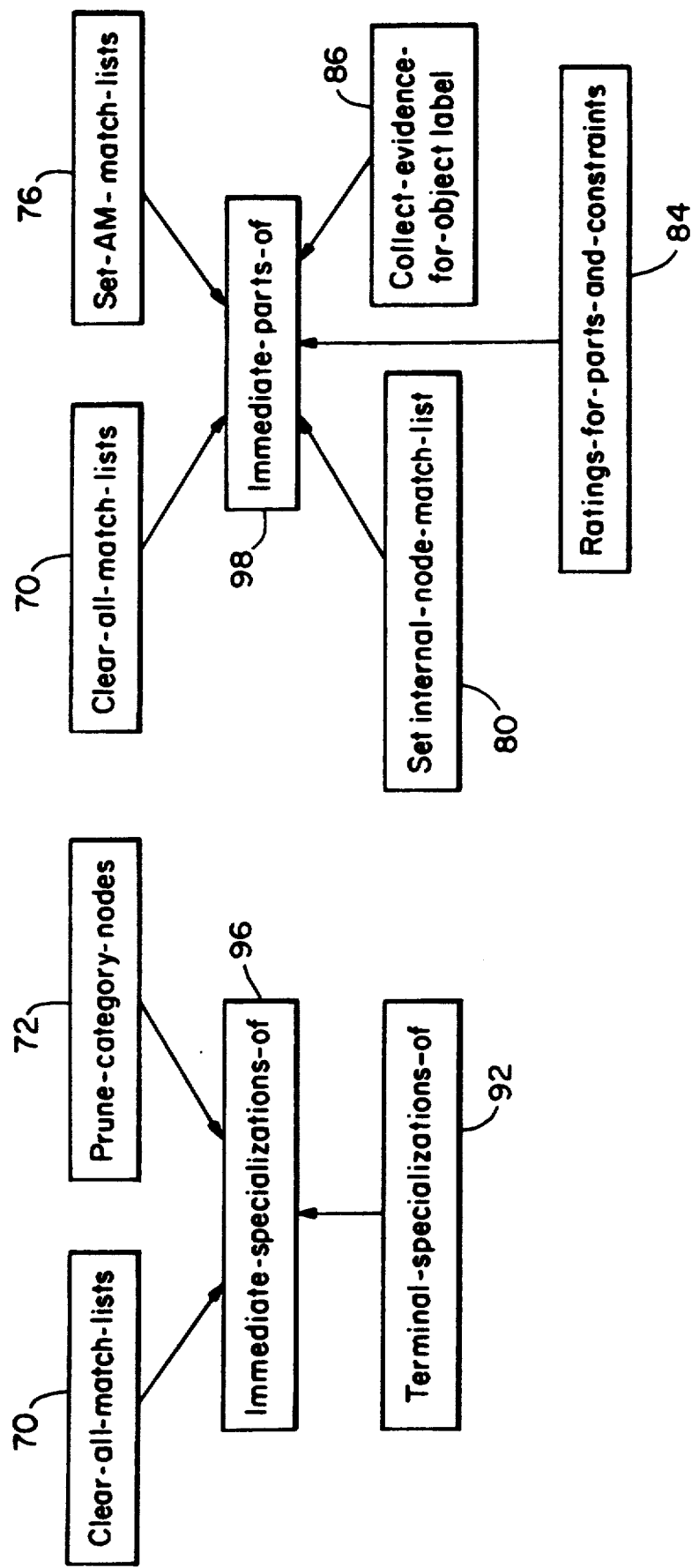

A description of the software implementation of the matching module 12 of the present invention is provided next in conjunction with FIGS. 7a-7b. In accordance with the illustration of FIG. 6 and the associated discussion, the main "matching engine" procedure of FIG. 7a is divided into symbolic matching, evidential processing and matched selection procedures to closely parallel the steps by the same name in FIG. 6. In general in reading FIG. 7a, an arrow from procedure A to procedure B indicates that at some point A is calling B. Note that four of the procedures are calling themselves, a significant part of the power and compactness of the matching module lies in these recursive components.

FIG. 7a does not show two auxiliary routines called by many of the procedures listed. These simple routines have been omitted to avoid cluttering the essential parts of FIG. 7a, but they are shown in FIG. 7b together with the procedures which call them.

In a depth first manner, each procedure of FIG. 7a is described in a standardized format. After defining the inputs and outputs of the procedure, its processing steps are set forth in a language that is a mixture of English and Pascal believed to be sufficient to avoid ambiguities. The Pascal-like key words that are used are: for, if, then, else, elseif, and return. It is noted that the procedures strongly rely on list processing. This is both convenient for explanation purposes and an obvious consequence of LISP as the preferred implementation language. Some of the terms used in the standardized phrases are reminiscent of this, e.g. list, empty list (or nil), append (to the end of a list). splice etc. These operations should be readily understood by one skilled in the art.

"Matching Engine", the top level procedure 62 of FIG. 7a, which implements the matching module 12 of FIG. 6, has three inputs —the event (symbolic description of a data event), primitives (a list of symbolic descriptions for the primitives resulting from the decomposition of the data event), and the root node or some other category node of the AM hierarchy of interest from the model library 14, 22, 24 (FIGS. 1 and 2). The matching engine 62 also initializes processing parameters to be used by the procedures called by this main procedure. The processing parameters include the match-threshold (a number in the closed range [0,1]), activity condition (a symbol equal to either "all-terminals-matched" variable or "not-all-terminals-unmatched", and the and the inactivity-penalty (an integer in the range of 0 to 3).

The matching engine procedure 62 consists of successive calls to the procedures symbolic matching 64, evidential processing 66 and match selection 68.

As a result of the extremely simple match selection rule used in the match selection step 60 (FIG. 6), the matching engine procedure 62 provides as output a two element list, called "best-match". The first element of this output list is either the "has-name" attribute of an object-label node of the input AM hierarchy of interest, or the symbol "none", whichever best matches the input event and its primitives. The second list element is the corresponding degree of belief. In the case where the list of primitives is empty, the evidential processing 66 (58 in FIG. 6) immediately generates the basic probability assignment (((none) 1.0)) and the match selection procedure 68 (60 in FIG. 6) finds that the list to be returned is (none 1.0). Thus by design, when the input list of primitives is empty, the system always concludes that the event and its primitives certainly do not correspond to any of the object labels of the hierarchy.

In addition to the "best-match" list returned, the main procedure 62 produces a side effect. At a minimum, "has-match-list" attributes of all constraints in the portion of the AM hierarchy rooted at the input node are reset to the empty list (even in the case of an empty input list of primitives) and some of these attributes are generally further set by the symbolic matching procedure 64 which represents the symbolic matching step 56 of FIG. 6. Once the matching engine procedure 62 has finished its task, all of the match lists of the input AM hierarchy can be examined by the user. One typical use of these matched lists is to obtain the pairings of terminal parts and primitives that correspond to the best match returned by the main procedure (e.g. in the preferred embodiment of FIG. 2, one can find which subcontour or subregion corresponds to the gun of a tank, as well as the corresponding degree of match).

The matching engine procedure 62 has the form:

```
matching engine (event primitives
        category-node
        match-threshold
        activity-condition
        inactivity-penalty)
1. Set active-object-label-nodes to the list
    returned by the call
    symbolic-matching (event primitives
        category-node
        match-threshold
        activity-condition
        inactivity-penalty).
2. Set bpa to the list returned by the call
    evidential-processing (active-object-label-
    nodes activity-condition inactivity-penalty).
3. Set best-match to the list returned by the
    call
    match-selection (category-node bpa)
4. Return best-match.
```

The symbolic matching procedure 64 receives as input, the event, primitives, category-node (root or category node of the input AM hierarchy), match-threshold, activity-condition, and the inactivity-penalty parameters of the main procedure 62.

The output of the symbolic matching procedure 64 is either the empty list (in the case of an empty input list of primitives) or the list of object label nodes (i.e. the object-label nodes that have survived pruning). The symbolic matching procedure 64 also produces a side effect. The "has-match-list" attribute of all nodes and constraints of the portion of the AM hierarchy rooted at the given category-node are first set to the empty list, and then in the case of a non-empty input list of primitives, some of these nodes and constraints are further set to appropriate values.

The symbolic matching procedure has the basic form:

```
symbolic matching (event primitives
        category-node
        match-threshold
        activity-condition
        inactivity-penalty)
1. Set to the empty list the has-match-list
    attributes of all the nodes and
```

```
            constraints in the part of the AM
            hierarchy rooted at category-node by the
            (recursive) call
            clear-all-match-lists (category-node)
    2.  If primitives is empty
    3.  then set active-object-label-nodes to the
            empty list.
    4.  else
    5.  Set active-object-label-nodes to the list
            returned by the (recursive) call
            prune-category-nodes (category-node event
                match-threshold).
    6.  For each element node in active-object-
            label-nodes
    7.  Set the has-match-list attributes of all
            the nodes and constraints of the AM rooted
            at node by the (recursive) call
            set-am-match-lists (node primitives
                match-threshold
                activity-condition
                inactivity-penalty).
    8.  Return active-object-label-nodes.
```

Step 1 resets the match list in the input AM hierarchy. This is accomplished by a call to a procedure "clear all match-lists" which resets to the empty list the "has-match-list" attributes of all nodes and constraints in the portion of the input AM hierarchy rooted at the input node. Thus, the "clear-all-match-lists" procedure receives for input the input node of the AM hierarchy of interest and provides as output the side effect of resetting all "has-match-list" attributes in the appropriate portion in the input AM hierarchy.

The "clear-all-match-lists" procedure has the following form:

```
        clear-all-match-lists (node)
    1.  Set the value of has-match-list attribute
            of the node to the empty list.
    2.  For each element "constraint" in the value
            of the has-constraints attribute of node
    3.  Set the value of the has-match-list
            attribute of the constraint to the empty
            list.
    4.  Set categories to the list returned by the
            call
            immediate-specializations of (node).
    5.  For each element "category" of categories
    6.      Use the (recursive) call
                clear-all-match-lists (category).
    7.  Set "parts" to the list returned by the
            call
            immediate-parts-of (node).
    8.  For each element "part" of parts
    9.      Use the (recursive) call
                clear-all-match-lists (part).
```

Step 5 of the symbolic matching procedure 64 calls the procedure "prune-category-nodes" 72 which implements the pruning phase of the symbolic matching step 56 of FIG. 6. The procedure 72 is responsible for selecting the object-label nodes that are the roots of the active AMs that will be further examined in the AM matching phase of the symbolic matching step 56. The procedure 72 is recursive and explores the category node portion of the input AM hierarchy in a depth first search manner. Upon reaching a new category node, the procedure uses the subprocedure set-property-node-match-list 74 to compare the input event to the description of the node, to compute a degree of match, and to set the "has-match-list" attribute of the node. If the resulting degree of match is no greater than the input parameter match-threshold, then the depth first search does not continue down the branches rooted at the category node. Therefore, none of the object-label nodes that belong exclusively to these branches will be included in the returned list. If the degree of match is greater than the threshold, then either the category node is added to the list to be returned (if the category node is an object-label node), or the depth first search is continued with the children of the node (if the node is not an object-label node).

The operation of this subprocedure 74 suggests a criterion that should be considered when defining the category node portion of an AM hierarchy: the degree of match for the match of the event to a category node should never be less than the highest degree of match computed for the match to any of the subcategories of that node. One of the reasons for this is that it is not reasonable to have the depth first search stopped in the middle of the hierarchy of category nodes because of a match that is not above the match threshold, when one of the categories below could produce a match above threshold. In another case, a child object node might be rejected when the search deals with one parent node, and then accepted when the search deals with another parent node of that child node. The criterion may be met by a careful design of the "has-property-set" attribute of all category nodes. At a higher level of abstraction, this criterion amounts to requiring that the properties defined, for a category become more specific (i.e. the test of the properties become more stringent), as one moves from upper to lower levels of the hierarchy.

The procedure prune-category-nodes 72 has as inputs, the category node, the input event and the match-threshold, and provides for output in a variable labelled "nodes" a list of object-label nodes not removed by pruning. The prune-category-nodes procedure 72 has the form:

```
        prune-category-nodes (category-node event
                match-threshold)
    1.  Initialize nodes to the empty list, and
            set event-list to the list with event as
            the only element.
    2.  Set the value of the has-match-list
            attribute of category-node by the call
            set-property-node-match-list (category
            node event-list).
    3.  If the degree of match of the only element
            of the has-match-list attribute of
            category-node is greater than
    4.  then
    5.      Set "subcategories" to the list
                returned by the call
                immediate-specializations-of
                category-node).
    6.      If "subcategories" is empty (i.e., if
                category-node is an object-label
                node)
    7.      then
    8.          If category-node is not already
                    in nodes
    9.          then append category-node to
                    nodes
    10.     else (i.e., category-node is not
                an object-label node)
    11.         For each element subcategory of
                    "subcategories"
    12.             Set new-nodes to the
                        list returned by the
                        (recursive) call
        prune-category-nodes (subcategory event
                match-threshold).
    13.             If new-nodes is not
                        empty
```

```
14.         then
15.            For each element
                  node of new-nodes
16.               If node is
                     not already
                     in nodes
17.               then append
                     node to
                     nodes.
18. Return nodes.
```

And the set-property-node-match-list subprocedure 74 has for input the input node and a variable "descriptions" which is a list containing either the symbolic description of an event or symbolic descriptions of primitives. Hence, the subprocedure 74 applies either the property set of a category node to an event or the property set of a terminal node to a primitive. Output of the subprocedure 74 is the side effect of the "has-match-list" attribute of the node of interest being set to its proper value. The form of the subprocedure 74 is as follows:

```
set-property-node-match-list (node descriptions)
1. Set property-set to the value of the
      has-property-set attribute of node.
2. Initialize match-list to the empty list.
3. For each element description of -
      "descriptions"
4.    Set degree-of-match to the number
         obtained by applying Eq. 1 to
         property-set.
5.    Append to match-list the pair
         (degree-of-match description).
6. Sort match-list by nonincreasing
      degree-of-match.
7. Set the value of has-match-list attribute
      of node to match-list.
```

It is noted that the "has-property-set" attribute of the node of interest is not in a form that can be immediately evaluated. Therefore, at load or compile time, a function is created from this attribute and stored in a "has-property-set-test" attribute which is then used to evaluate the property set. Since this translation is transparent to the user, the "has-property-set" attribute is used as if it were identical to the has-property-set-test attribute.

Steps 6 and 7 of the symbolic matching procedure 64 implements the AM matching phase of FIG. 6. For a particular AM, AM matching is accomplished by the procedure set-am-match-list 76. The complete AM-matching phase is achieved by applying this procedure 76 to all active object-label nodes. The procedure 76 has for input the input node, primitives, match-threshold. activity condition, and inactivity-penalty parameters. Besides calling itself, the procedure 76 calls three major subprocedures, set-property-node-match-list 74 (discussed above). set-constraint-match-list 78, and set-internal node-match-list 80 described later. Output of the set-am-match-list procedure 76 is the side effect of setting of the "has-match-list" attribute of each node or constraint in the part of the AM hierarchy rooted at the input node. The procedure 76 has the form:

```
set-am-match-lists (node primitives
      match-threshold
      activity-condition
      inactivity-penalty)
1. Set "parts" to the list returned by the
      call
      immediate-parts-of (node).
2. If "parts" is empty (i.e., if node is a
      terminal node)
3. then set the value of the has-match-list
      attribute of the node by the call
      set-property-node-match list (node
      primitives)
4. else (i.e., node is an internal node)
5.    For each element part of "parts"
6.       Set the has-match-list
            attributes of all the nodes and
            constraints in the tree rooted
            at part by the (recursive) call
         set-am-match-lists (part primitives
            match-threshold
            activity-condition
            inactivity-penalty).
7.    For each element constraint of the
         node attribute has-constraints
8.       Set the value of the
            has-match-list attribute of
            constraint by the call
         set-constraint-match-list (constraint
            match-threshold
            activity-
            condition).
9.    Set the value of has-match-list
         attribute of node by the call
         set-internal-node-match-list
         (node match-threshold
         activity-condition
         inactivity-penalty).
```

The set-am-match-list procedure 76 begins by attempting to set the "has-match-list" attribute of the input node. In order to do this, it must first set the corresponding attributes of all the parts and constraints depending on that node, and so on. This suggests a recursive implementation. Since the procedure 76 is initially called with some active object-label node as its first argument, the net effect of this first recursive call is to set all the "has-match-list" attributes within the corresponding AM.

In particular, where the input node is a terminal node, the "has-match-list" attribute of the input node is set by calling the subprocedure "set-property-node-match-list" 74 described earlier. In the case where the input node is an internal node, the procedure set-am-match-list 76 is recursively called on the parts of the input node and the "has-match list" attribute of each constraint associated with the input node is set by using the subprocedure set-constraint-match-list 78. Finally, the "has-match-list" attribute of the input node is set by a call to the subprocedure set-internal-node-match-list 80.

The subprocedure set-constraint-match-list 78 has for input a constraint of interest of an internal node in an AM, the match threshold, and the activity-condition parameter. The purpose (i.e. output/side effect) of the subprocedure 78 is to set the "has-match-list" attribute of a constraint of interest. The subprocedure 78 has the following form.

```
set-constraint-match-list (constraint
      match-threshold
      activity-condition).
1. Initialize match-list to the empty list.
2. Set "constrainees" to the value of the
      attribute has-constrainees of the
      constraint.
3. Set match-lists to the list obtained by
      replacing each element constrainee of
      "constrainees" by the value of the
```

-continued

```
        constrainee attribute has-match-list
        (necessarily a nonempty list).
4.   Initialize constraint-always-inactive to
     FALSE.
5.   For each element match-list of match-lists
        If the first element of match-list,
        i.e., necessarily a pair of the form
        (degree-of-match matched-data).
6.      then
7.         Set constraint-always-inactive
           to TRUE.
8.         Exit loop 5.
9.   If constraint-always-inactive is FALSE
10.  Set cartesian-product to the list
     returned by the call
     cartesian-product-of-matched-data
     (match-lists
     "constraint" match-threshold).
11.  For each element
     match-data-combination of
     cartesian-product, where each element
     is necessarily of the form
     (matched-data-constrainee-1
     matched-data-constrainee-2 . . .),
12.     Initialize active-constraint to
        TRUE.
13.     If activity-condition is
        "all-terminals-matched"
14.     then
15.        For each element
           matched-data-constrainee-
           i of matched-data-combination
16.           If
              matched-data-constrainee-i
              contains one or more nil's at
              any level of nesting
17.           then
18.              Set
                 active-constraint
                 to FALSE.
19.              Exit loop 15.
20.     else if activity-condition is
        "not-all-terminals-unmatched"
21.     then
22.        For each element
           matched-data-constrainee-
           i of matched-data-combination
23.           If matched-data-
              constrainee-i contains only
              nil's at all levels of nesting
24.           then
25.              Set
                 active-constraint
                 to FALSE.
26.              Exit loop 22.
27.     If active-constraint is TRUE
28.     then
29.        Set degree-of-match to
           the value returned by
           the function given by
           constraint's attribute
           has-function when called
           with the elements of
           matched-data-combination
           as arguments.
30.        Append to match-list the
           pair (degree-of-match
           matched-data-combination).
31.  If match-list is not empty
32.  then sort match-list by nonincreasing
     degree of match
33.  Set the attribute has-match-list of
     constraint to match-list.
```

Most of the steps of the subprocedure 78 are used to determine whether the constraint is active or inactive according to the following definitions
Active and inactive parts definition:

The ith part of an internal node $\gamma$ is said to be inactive with respect to some matched data $\bar{x}_\gamma$ for $\gamma$ when the ith element $x_{\gamma,i}$ of $\bar{x}_\gamma$ (itself some matched data) obeys either of the following conditions:

i) $x_{\gamma,i}$ is nil;

ii) $x_{\gamma,i}$ contradicts a switch setting requiring that the terminal nodes of each part of $\gamma$ must all be matched to some primitives; or iii) $x_{\gamma,i}$ contradicts another setting of the above switch requiring that the terminal nodes of each part of $\gamma$ cannot be all unmatched.

A part that is not inactive is said to be active.

If for a constraint of interest, any constrainee whose highest degree of match in its "has-match-list" attribute is not greater than the input match-threshold then the constraint is said to be always inactive (Steps 4–8). The "has-match-list" attribute of the constraint is immediately set to the empty list and Steps 10–32 are skipped.

Otherwise, the cartesian product of matched data for the constraint of interest is computed at Step 10 by a call to the function "cartesian-product-of-matched-data" 82. Some of the elements of this product may still make the constraint inactive depending upon the value of the input parameter activity-condition, which implements the switch used in the definition above. That is, Steps 13–19 determine that the constraint is active with respect to an element of the cartesian product when the switch "activity condition" indicates that all terminal nodes of each constrainee must be matched. And Steps 20–26 determine whether the constraint is active with respect to an element of the cartesian product when the switch "activity-condition" indicates that the terminal nodes of each constrainee cannot all be unmatched.

The elements making the constraint inactive are eliminated and the constraint function is applied to each of the remaining elements in order to compute the corresponding degree of match (Steps 27–30). Each element of the cartesian product for which the constraint is active, together with the related degree of match, produce one element of the "has-match-list" attribute of the constraint. Steps 31–32 then sort the match list by nonincreasing degrees of match.

The function cartesian-product-of-matched-data 82 has inputs "match-lists" which is a list whose elements are the values of the has-match-list attribute of either the constrainees of a constraint or the parts of an internal node of interest (i e. a list of non-empty lists), "application" (a symbol equal to either "constraint" or "internal-node", and the match-threshold parameter. The function 82 computes a cartesian product of matched data from the "has-match-list" attributes of either the constrainees of a constraint or the parts of a composite node. Hence, the function 82 output is a list called "cartesian-product" whose elements are similar but not identical to the customary cartesian product of the lists in the input "match-lists", where the ith element of each list is replaced by its second element matched-data-i.

The function 82 has the form:

```
cartesian-product-of-matched-data (match-lists
                                   application
                                   match-threshold)
1.  Initialize matched-data-lists to the empty
    list.
2.  For each element match-list of match-
    lists
3.     Initialize matched-data-list to the
       empty list.
4.     For each element pair of match-list,
```

-continued

```
           where pair is necessarily of the form
           (degree of-match matched-data).
  5.       If degree-of-match >
           match-threshold
  6.       then append matched-data to
           matched-data-list
  7.       else exit loop 4 (because
           matches are necessarily sorted
           by nonincreasing degree of
           match).
  8.    If application is the symbol
         "internal-node"
  9.    then append nil to
         matched-data-lists.
 10.   Append matched-data-list to
       matched-data-lists.
 11.   Note that matched-data-lists is
       necessarily of the form
           ($\lambda_1 \ldots \lambda_i \ldots \lambda_n$)
           $\lambda_i = (\mu_{i,1} \ldots \mu_{i,j} \ldots \mu_{i,mi})$
       with n and each of the mi's at least equal
       to 1.
 12.   Initialize previous-partial-product to the
       list
           ($1_1 \ldots 1_k \ldots 1_{ml}$)
       where $1_k$ is the list whose only element is
       $\mu_{l,k}$.
 13.   If n > 1
 14.   then
 15.      For each element $\lambda_i$ in ($\lambda_2 \ldots \lambda_i \ldots \lambda_n$)
 16.         Initialize new-partial-product
             to the empty list.
 17.         For each $\mu_{i,j}$ in $\lambda_i$
 18.            For each element $1_k$ in
                previous-partial-
                product
 19.               If $1_k$ and $\mu_{i,j}$
                   have no common
                   "leaf" elements
                   (nil's excluded)
 20.               then
 21.                  Append $\mu_{i,j}$ to $1_k$.
 22.                  Append new $1_k$ to
                      new-partial-product.
 23.            Set previous-partial-product to
                new-partial-product.
 24.   Set cartesian-product to previous partial-
       product.
 25.   Return cartesian-product.
```

In Steps 1-11, the first input to the function 82 (a list of match lists) is used to construct a list of truncated lists of corresponding matched data. The term "truncated" indicates that any match-list element not above the given match threshold is discarded. Each truncated list is augmented with nil in the case where the second input indicates that the cartesian product is to be computed for an internal node.

In Steps 12-24, the cartesian product of the possible augmented lists of matched data is computed. Any element in the resulting product with duplicated leaves is eliminated. In particular, the check for duplicated leaves is performed after obtaining each partial product as described previously.

The third subprocedure of the set-am-match-list procedure 76 is called set-internal-node-match-list 80. This subprocedure 80 sets the match list of the "has-match-list" attribute of the input node. The subprocedure 80 has for its inputs a variable "node" which represents an internal node of an AM, the match-threshold parameter, the activity-condition parameter, and the inactivity-penalty parameter. The form of the subprocedure 80 is as follows:

```
     set-internal-node-match-list (node
         match-threshold
         activity-condition
         inactivity-penalty)
 1.  Initialize match-list to empty list.
 2.  Set parts to the list returned by the call
     immediate-parts-of (node).
 3.  Set constraints to value of node attribute
     has-constraints.
 4.  Compute $c'_{\gamma,max}$ and $c'_{\gamma,min}$ where $c'_{\gamma,max}$
     is the sum of the values of the
     has-confirming-weight attributes of all
     the elements of "parts" and "constraints"
     of node, and $c'_{\gamma,min}$ is the negative of
     the corresponding quantity for the
     disconfirming weights.
 5.  Set match-lists to the list obtained by
     replacing each element "part" of parts by
     the value of the part attribute
     has-match-list (necessarily a nonempty
     list).
 6.  Set cartesian-product to the list returned
     by the call
     cartesian-product-of-matched-data
     (match-lists "internal-node"
     match-threshold).
 7.  For each element matched-data of
     cartesian-product, where each element is
     necessarily of the form
     (matched-data-part 1 matched-data-
     part-2 . . . )
 8.     Set
        part-and-active-constraint-ratings,
        inactive-constraint-ratings, and
        constraint-ratings-for-inactive-
        constrainees to the successive
        elements of the list returned by the
        call
     ratings-for-parts-and-constraints (node
     matched-data activity-condition
     inactivity-penalty).
 9.    Set "ratings" to the list obtained by
       splicing the lists part-and-active-
       constraint-ratings and inactive-
       constraint-ratings.
10.    If some element of ratings is equal
       to 1.0
11.    then set absolutely-confirmed to TRUE
12.    else set absolutely-confirmed to
       FALSE.
13.    If some element of ratings is equal
       to -1.0
14.    then set absolutely-disconfirmed to
       TRUE
15.    else set absolutely-disconfirmed to
       FALSE.
16.    If absolutely-confirmed and
       absolutely-
       disconfirmed are both TRUE
17.    then stop and report "error" (see Eq.
       3 line 1)
18.    else if absolutely-confirmed is TRUE
19.    then set total-degree-of-confidence
       to $c'_{\gamma,max}$ (Eq. 3 line 2)
20.    else if absolutely-disconfirmed if
       TRUE
21.    then set total-degree-of-confidence
       to $c'_{\gamma,min}$ (Eq. 3 line 3)
22.    else
23.       If inactivity-penalty is 0
24.       then set loss to 0.0 (see
          discussion of L loss of
          confidence)
25.       else if inactivity-penalty is 1
26.       then set loss to the SUM of the
          elements in
          inactive-constraint-ratings (see
          discussion of L loss of
          confidence)
27.       else if inactivity-penalty is 2
28.       then
29.          Initialize loss to 0.0
```

-continued

| | |
|---|---|
| 30. | For each element "pair" of constraint-ratings-for-inactive-constrainees |
| 31. | Compute the AVERAGE of the weights in the second element of "pair". |
| 32. | Add this average to loss |
| 33. | else if inactivity-penalty is 3 |
| 34. | then proceed as above, but take MINIMUM (instead of average) (see discussion of L loss of confidence). |
| 35. | Set total-degree-of-confidence to the result of adding loss to the sum of all ratings in part-and-active constraint-ratings (see Eq. 3, line 4). |
| 36. | Set degree-of-match to the result of applying Eq. 4 to total-degree-of-confidence. |
| 37. | Append to match-list the pair (degree-of-match match-data). |
| 38. | Sort match-list by nonincreasing degrees of match. |
| 39. | Set value of node attribute has-match-list to match-list. |

In Steps 2-3 all parts and constraints of the input internal node are obtained. In Steps 5-6 the cartesian product of matched data for that node is computed by calling the function "cartesian-product-of-matched-data" 82 described above.

Step 7 loops through all the elements of the cartesian product. Step 8 computes all the necessary rating information including:

a) the list of ratings for all the parts and active constraints of the input internal node, b) the list of ratings for all the inactive constraints of that node, and c) the list where each element gives an inactive (constrainee) part of that node together with the ratings of all inactive constraints in which it is involved. This is accomplished by the function "ratings-for-parts-and-constraints" 84.

Steps 9-15 determine whether at least one of the ratings is equal to +1 and/or and least one of them is equal to −1. The effect of any such rating is to completely confirm or disconfirm the match of the input internal node.

Steps 16-36 compute the total degree of confidence according to Equation 3 and the corresponding degree of match according to Equation 4. Step 38 sorts the match list by non-increasing degree of match.

The function "ratings-for-parts-and-constraints" 84 is provided input of an internal AM node, a matched-data variable which is matched to the input internal node and is a list of matched data corresponding to the parts of the node, the activity-condition parameter and the inactivity-penalty parameter. The function 84 computes the rating $r_\alpha$ ($\bar{x}_\alpha$) for each part and constraint $\alpha$ for the input internal node $\gamma$ for a given matched data vector $\bar{x}_\gamma$. The function 84 also generates the ratings for all the inactive constraints associated with each inactive constrainee/part of $\gamma$. More precisely, the function 84 returns a three element list variable named "rating-info" containing:

1. The list of ratings for all parts and active constraints of $\gamma$, i.e. the list "part-and-active-constraint-ratings" of $r_\alpha$'s for all $\alpha$ in the set of parts of $\gamma$ and active constraints of $\gamma$, 2. The list of ratings for all inactive constraints of $\gamma$, i.e. the list "inactive-constraint-ratings" of $r_\alpha$'s for all $\alpha$ in the set of inactive constraints of $\gamma$, and 3. Nil if the input parameter inactivity-penalty is 0 or 1; otherwise, if inactivity-penalty is 2 or 3 a list "constraint-ratings-for-inactive-constrainees" where each element is a pair corresponding to some inactive part p of $\gamma$ that is also a constrainee of some inactive constraint of $\gamma$, the first element of the pair is the has-name attribute of p and the second is the list of ratings $r_\alpha$ for all constraints $\alpha$ that have p as a common constrainee.

The function ratings-for-parts-and-constraints 84 has the following form

| | ratings-for-parts-and-constraints (node matched-data activity-condition inactivity-penalty) |
|---|---|
| 1. | Initialize part-and-active-constraint-ratings to the empty list. |
| 2. | Initialize inactive-constraint-ratings to the empty list. |
| 3. | Initialize constraint-ratings for-inactive-constrainees to the empty list. |
| 4. | Initialize inactive-part-names to the empty list. |
| 5. | Set parts to the list returned by the call immediate-parts-of (node). |
| 6. | Set constraints to value of node attribute has-constraints. |
| 7. | For each element part-i of parts |
| 8. | Set active-part to TRUE. |
| 9. | If matched-data-part-i is nil |
| 10. | then set active-part to FALSE |
| 11. | else if activity-condition is the symbol "all-terminals-matched" and matched-data-part-i contains one or more nil's at any level of nesting |
| 12. | then set active-part to FALSE |
| 13. | else if activity-condition equals the symbol "not-all-terminals-unmatched", and matched-data-part-i contains only nil's at all levels of nesting |
| 14. | then set active-part to FALSE |
| 15. | If active-part is TRUE (i.e., if ith part is active) |
| 16. | then |
| 17. | Find the pair in the (necessarily nonempty) list value of part-i attribute has-match-list whose second element (matched data) is identical to matched-data-part-i (such a pair will always be found) and set $m_i$ to the first element of that pair (degree of match). |
| 18. | Set (normalized) degree of confidence $c_i$ to the result of applying Eq. 5 to $m_i$. |
| 19. | Set-rating to the result of applying Eq. 2 (line 1 or 2) to $c_i$. |
| 20. | Append rating to part-and-active-constraint-ratings. |
| 21. | else (i.e., ith part is inactive) |
| 22. | Append value of part-i attribute has-name to inactive-part-names. |
| 23. | If inactivity-penalty is 0 |
| 24. | Then set rating to 0.0 (see Eq. 2 line 3) |
| 25. | else if the value of part-i attribute shouldnt-be-present is TRUE |
| 26. | then set rating to the value of part-i attribute |

| | ratings-for-parts-and-constraints (node matched-data activity-condition inactivity-penalty) |
|---|---|
| | has-confirming-weight (see Eq. 2, line 4) |
| 27. | else set rating to the negative of the value of part-i attribute has-disconfirming-weight (see Eq. 2, line 5). |
| 28. | Append rating to part-and-active-constraint-ratings. |
| 29. | For each element constraint-i of constraints |
| 30. | Set active constraint to TRUE. |
| 31. | For each element constrainee of the value of constraint-i attribute has-constrainees |
| 32. | If constrainee attribute has-name is a member of the list inactive-part-names |
| 33. | then |
| 34. | Set active-constraint to FALSE |
| 35. | Exit loop 31. |
| 36. | If active-constraint is TRUE (i.e., if the ith constraint is active) |
| 37. | then |
| 38. | Set matched-data-constraint-i to the list of matched-data-part-i corresponding to the constrainees of constraint-i. |
| 39. | Find the pair in the (necessarily nonempty) list of the value of constraint-i attribute has-match-list whose second element (matched data) is identical to matched-data-constraint-i (such a pair will always be found) and set $m_i$ to the first element of that pair (degree of match). |
| 40. | Set (normalized) degree of confidence $c_i$ to the result of applying Eq. 5 to $m_i$. |
| 41. | Set rating to the result of applying Eq. 2 (line 1 or 2) to $c_i$. |
| 42. | Append rating to part-and-active-constraint-ratings. |
| 43. | else (i.e., ith constraint is inactive) |
| 44. | If activity-penalty is 0 |
| 45. | then set rating to 0.0 (see Eq. 2, line 3) |
| 46. | else if the value of constraint-i attribute shouldnt-be-present is TRUE |
| 47. | then set rating to the value of constraint-i attribute has-confirming-weight (see Eq. 2, line 4) |
| 48. | else set rating to the negative of the value of constraint-i attribute has-disconfirming-weight (see Eq. 2, line 5). |
| 49. | Append rating to inactive-constraint-ratings. |
| 50. | If inactivity-penalty is 2 or 3 |
| 51. | then |
| 52. | For each element constrainee of the value of constraint-i attribute has-constrainees |
| 53. | If the value of constrainee attribute has-name is a member of list inactive-part-names |
| 54. | If an element |
| | (necessarily unique, if one exists) of the (possible empty) list constraint-ratings-for-inactive-constrainees has the value of constrainee attribute has-name as its first element |
| 55. | then append to its second element (necessarily a list) the value of constraint-i attribute has-disconfirming-weight |
| 56. | else append to constraint-ratings-for-inactive-constrainees the pair whose first element is the value of constrainee attribute has-name and whose second element is the list having the value of constraint-i attribute has-disconfirming-weight as its only element. |
| 57. | Set rating info to the-list whose elements are part-and-active-constraint-ratings, inactive-constraint-ratings and constraint-ratings for-inactive-constrainees. |
| 58. | Return rating-info. |

In Steps 5-6, all the parts and constraints of the input internal node are obtained. Step 7 loops through all the parts of the input internal node. Steps 8-14 determine whether a part is active or inactive for the given input matched data.

Steps 15-20 compute the rating for an active part according to Equation 2. Steps 21-28 save the name of an inactive part and compute its rating according to Equation 2.

Step 29 loops through all the constraints of the input node. Steps 30-35 determine whether a constraint is active or inactive for the given matched data by inspecting the previously obtained list of names of inactive parts.

Steps 36-42 compute the rating for an active constraint according to Equation 2. Steps 43-56 compute the rating according to Equation 2 for an inactive constraint and constructs the list giving the ratings of all the constraints associated with each inactive constrainee. Step 58 returns the three element list described above.

As illustrated by FIG. 7a, this completes the symbolic matching procedure 64. The evidential processing procedure 66 and its subprocedures are described next in a top down manner. The evidential processing procedure 66 implements the evidential processing step 58 in FIG. 6. The procedure 66 is provided input of a variable named "active-object-label-nodes" which is the list of nodes returned by the call to the symbolic matching procedure 64, the activity-condition and the inactivity-penalty parameters.

The output of the procedure is the overall basic probability assignment (bpa), or equivalently the belief function, that completely summarizes the processes of collection and accumulation of evidence. The overall bpa returned is a list of pairs where the first element of each pair is a list representing a focal element of the bpa (a subset of the frame of discernment $\theta$ of interest with non-zero degree of support. The second element of each pair is the corresponding non-zero degree of support s. In the special case where the given list of active object-label nodes is empty (which happens when the list of primitives given to the main matching engine procedure 62 is empty, the overall bpa returned is simply (((none) 1.0)). The evidential processing procedure 66 has the following form:

```
evidential-processing
     (active-object-label-nodes
      activity-condition
      inactivity-penalty)
1.  If active-object-label-nodes is empty
2.  then set bpa to the list whose only
     element is
      (none-list 1.0),
      where none-list is the list whose only
      element is the symbol of "node".
3.  else
4.  Set frame-of-discernment to the list
     obtained by first replacing each
     element node in
     active-object-label-nodes by the
     value of the node attribute has-name
     and then appending "none" at the end.
5.  Initialize evidences to the empty
     list.
6.  For each element node in
     active-object-label-nodes
7.     Set "evidence" to the list
        returned by the call
     collect-evidence-for-object-label (node
     frame-of-discernment activity-condition
     inactivity-penalty).
8.     Append evidence to evidences.
9.  Set bpa to the list returned by the
     call
     combine-evidence-for-all-object-labels
     (evidences frame-of-discernment).
10. Return bpa.
```

Briefly, Steps 1 and 2 tend to the case of an empty list of active object-label nodes, and returns the bpa set to (((none) 1.0)). Step 4 creates the frame of discernment $\theta$ corresponding to all active object-label nodes. Steps 5–8 perform the collection of evidence phase of the evidential processing step 58 of FIG. 6 by calling subprocedure "collect-evidence-for-object-label" 86. Step 9 performs the combination of evidence phase of the evidential processing step 58 of FIG. 6 by calling subprocedure "combine-evidence-for-all-object-labels" 88.

The subprocedure "collect-evidence-for-object-label" 86 implements the evidence collection phase of the evidential processing step 58 in FIG. 6 for a particular object-label node. The complete evidence collection phase is achieved by applying this subprocedure 86 to all active-object-label-nodes. The subprocedure 86 implements all the ideas presented earlier regarding the collection of positive or negative evidence for or against the input nodes.

The subprocedure 86 is provided input of an active object-label node of an AM hierarchy, frame-of-discernment which is a list containing the values of the "has-name" attribute of all the active object-label nodes plus the symbol "none", the activity-condition and the inactivity-penalty parameters. The subprocedure 86 provides for output a variable "evidences" which is a list whose elements have the form (hypothesis support), where "hypothesis" corresponds to a subset of the input frame of discernment regarded as a set and where "support" is a number in the closed range [0,1]. The form of the subprocedure collect-evidence-for-object-label 86 is as follows:

```
collect-evidence-for-object-label
     (node frame-of-discernment
      activity-condition
      inactivity-penalty)
1.   Initialize "evidences" to the empty list.
2.   Set hypothesis to the list whose only
     element is the value of node attribute
     has-name.
3.   Set complementary-hypothesis to the list
     whose elements are those of
     frame-of-discernment with the element of
     hypothesis removed.
4.   Get the first element of the value of node
     attribute has-match-list, i.e.,
     (degree-of-match matched-data).
5.   Set part-and-active-constraint-ratings,
     inactive-constraint-ratings, and
     constraint-ratings-for-inactive-
     constrainees to the successive elements of
     the list returned by the call
     ratings-for-parts-and-constraints (node
     matched-data
     activity-condition
     inactivity-penalty).
6.   If inactivity-penalty is 0
7.   then set ratings to part-and-active-
     constraint-ratings
8.   else if inactivity-penalty is 1
9.   then set ratings to the result of splicing
     the lists
     part-and-active-constraint-ratings and
     inactive-constraint-ratings
10.  else if inactivity-penalty is 2
11.  then set ratings to the result of splicing
     the list
     part-and-active-constraint-ratings and the
     list obtained by replacing each element
     pair of inactive constraint-ratings by the
     AVERAGE of the elements (ratings) in the
     second element of pair (a list)
12.  else if inactivity-penalty is 3
13.  then set ratings to the result of splicing
     the list part-and-active-constraint-
     ratings and the list obtained by replacing
     each element pair of inactive-constraint-
     ratings by the MINIMUM of the elements
     (ratings) in the second element of pair (a
     list).
14.  for each element rating of ratings
15.  If rating > 0.0
16.  then append to evidences the pair
     (hypothesis rating)
17.  else if rating < 0.0
18.  then append to evidences the pair
     (complementary-hypothesis-rating)
19.  else (i.e., rating = 0.0) do not
     append anything to evidences.
20.  Return evidences.
```

Briefly, in Steps 2–3, the parts and constraints of the input active object-label node can only generate support for or against the node. Evidence for this node will give support to the element of the input frame of discernment $\theta$ corresponding to the "has-name" attribute of the input active object-label node. Evidence against the node will give support to the subset of $\theta$ which contains all the other elements of $\theta$. Note that $\theta$ does not include any of the object-label nodes rejected during pruning (Step 5 of procedure symbolic-matching 64).

In Step 4, the first element of the "has-match-list" attribute of the input active object-label node is obtained. That is, the match of primitives to the terminal nodes of the AM rooted at the input object label node with the highest degree of match (because of the systematic ordering of the elements of a match list by non-increasing degree of match) is attained. All other matches are effectively ignored in making the final matching decision, even if some of the other matches have degrees of match which are equal or very close to that of the first match.

Step 5 computes all the necessary rating information by calling the function ratings-for-parts-and-constraints 84 described above. The rating information includes:

a) the list of ratings for all the parts and active constraints of the input object-label node, b) the list of ratings for all the inactive constraints of that node, and c) the list where each element gives an inactive (constrainee) part of that node together with the ratings of all constraints in which it is involved.

It is noted that the function ratings-for-parts-and-constraints 84 is called first by the subprocedure set-internal-node-match-list 80 in the symbolic matching processing and then by subprocedure collect-evidence-for-object-label 86 in the evidential processing. Hence, the ratings computed by this function are computed twice to be used as degrees of support. The alternative is to store these ratings in some attribute of the object-label nodes the first time they are computed. However, the saving in computation that would be achieved would be rather small. Only the object-label nodes that have survived pruning are involved in the second round of rating calculations, and for each of these nodes only the ratings corresponding to a single element of its matched list need to be considered. In the first time that the desired ratings are computed, all the elements of the matched list must be considered.

Steps 6-13 of the subprocedure collect-evidence-for-object label 86 determine the ratings or combined ratings of all candidate pieces of evidence. Steps 14-19 loop through all the computed ratings. A positive rating is used to support the hypothesis in the input frame of discernment $\theta$ corresponding to the input active object-label node. A negative rating is used to support the complementary hypothesis in $\theta$. A rating of 0 is ignored. For each piece of evidence, the subset that it supports as well as the corresponding degree of support is reported.

The subprocedure combine-evidence-for-all-object-labels 88 implements the evidence combination phase (the second phase) of the evidential processing step 58 of FIG. 6. This subprocedure 88 combines the pieces of evidence that were produced for all the active AM's by applying the subprocedure collect-evidence-for-object-label 86 to each active object-label node. The combine-evidence-for-all-object-labels subprocedure 88 computes bpa's (basic probability assignments) for all pieces of evidence and combines the bpa's based on Dempster's rule of combination.

In particular, the subprocedure 88 has the inputs of "evidences" which is a list whose elements are of the form (hypothesis support), where "hypothesis" is a list corresponding to a subset of the input frame of discernment, and "support" is a number in the closed range [0,1]. The input frame of discernment is a list treated as a set containing the values of the "has-name" attribute of all the object-label nodes that survived pruning and the symbol "none". The subprocedure 88 provides for an output the variable "bpa" whose value is the overall basic probability assignment. The form of subprocedure combine-evidence-for-all-object labels 88 is as follows:

| combine-evidence-for-all-object-labels (evidences frame-of-discernment) | |
|---|---|
| 1. | Initialize bpa to the list whose only element is (frame of discernment 1.0). |
| 2. | For each element of evidences, say (hypothesis support), |
| 3. | Set new-bpa to the list whose elements are (hypothesis support) and (frame-of-discernment 1-support). |
| 4. | Set bpa to the result of the call orthogonal-sum-of-bpas (bpa new-bpa). |
| 5. | Return bpa. |

In Step 1 of the subprocedure 88 a vacuous belief function is used as the initial value of the bpa to be returned. The vacuous belief function is given by $$m(A) = \begin{cases} 1 & \text{if } A = \theta \\ 0 & \text{otherwise,} \end{cases}$$

where A is a subset of $\theta$, and m(A) is a basic probability number. The foregoing definition of the vacuous belief function provides that before considering any piece of evidence, one is completely ignorant and that all the singleton hypotheses in the frame of discernment $\theta$ are equally probable with a belief 1/n, where n is the number of elements of $\theta$.

Step 2 loops through all the pieces of evidence. Step 3 produces a simple support belief function described previously that applies all the support for a piece of evidence to the corresponding hypothesis and the balance of belief to the frame of discernment $\theta$.

Step 4 updates the bpa to be returned by combining it with the simple support function using the function orthogonal sum-of-bpas 90 which implement Dempster's rule of combination.

The function orthogonal sum-of-bpa 90 receives as input bpa-1 which is a list whose elements are of the form (hypotheses support), where hypotheses corresponds to a subset list of the frame of discernment $\theta$ regarded as a set, and support is a number in the closed range [0,1]. A second input labelled bpa-2 is also provided and has the same value as bpa-1. The function 90 provides for output the variable bpa which represents the bpa that is the orthogonal sum of bpa-1 and bpa-2. In the case where the result is "undefined", the function 90 returns the empty list.

The form of the function 90 is as follows

| orthogonal-sum-of-bpas (bpa-1 bpa-2) | |
|---|---|
| 1. | Initialize bpa to the empty list. |
| 2. | For each element of bpa-1, say (hypothesis-1 support-1), |
| 3. | For each element of bpa-2, say (hypothesis-2 support-2), |
| 4. | Set intersection to the list containing the elements common to the lists hypothesis-1 and hypothesis-2. |
| 5. | If intersection is not the empty list |
| 6. | then |
| 7. | Set support-product to the product of support-1 and support-2. |
| 8. | If intersection is "equal" (in the sense of |

| | orthogonal-sum-of-bpas (bpa-1 bpa-2) |
|---|---|
| | sets) to the first element of some element (list) of bpa |
| 9. | then add support-product to the second element of that list of bpa |
| 10. | else append to bpa the list (intersection support-product). |
| 11. | Set normalization-factor to the sum of the numbers in each of the elements of bpa. |
| 12. | If normalization-factor = 0.0 |
| 13. | then set bpa to the empty list |
| 14. | else if normalization-factor ≠ 1.0 |
| 15. | then divide each of the numbers in bpa by normalization-factor. |
| 16. | Return bpa. |

The third procedure called by the main matching engine procedure 62 in FIG. 7 is the match selection procedure 68. The match selection procedure 68 implements the simple match selection rule described previously. If a more complex selection rule is desired, this procedure 62 is the only one in FIG. 7 that would need to be changed.

The match selection procedure 68 is provided with the inputs of the category-node (which was used to call the symbolic matching procedure 64) and the variable bpa which is the bpa returned by the call to the evidential processing procedure 66. The match selection procedure 68 provides as output the variable "best-match" which is a list whose first element is either the name of an object-label node or the symbol "none", and whose second element is the corresponding degree of belief.

The form of the match selection procedure 68 is as follows:

| | match-selection (category-node bpa) |
|---|---|
| 1. | Initialize matches to the empty list. |
| 2. | Set label-nodes to the result of the call terminal-specializations-of (category-node). |
| 3. | Set labels to the list obtained by replacing each element label-node of label-nodes by the value of attribute has-name of label-node. |
| 4. | Append the symbol none to labels. |
| 5. | For each element label of labels |
| 6. | Set label-list to the list having label as its only element. |
| 7. | Set belief to the result of the call belief-in-hypothesis (bpa label-list). |
| 8. | Append to matches the list (belief label) |
| 9. | Sort elements of matches by order of nonincreasing belief. |
| 10. | Set best-match to the first element of matches. |
| 11. | Return best-match. |

In Step 2 of the match selection procedure 68 a function terminal-specializations-of 92 is called to find all the object-label nodes that belong to the portion of the AM hierarchy rooted at the input category node. Hence, the function 92 has as its input the category node, and provides for the input a list of all the object-labels that can be reached from the category node. The list is output in the variable "terminal-categories". The function terminal-specializations-of 92 has the following form:

| | terminal-specializations-of (category-node) |
|---|---|
| 1. | Set subcategories to the list returned by the call immediate-specializations-of (category-node). |
| 2. | If subcategories is the empty list |
| 3. | then set terminal categories to the list having category-node as its only element. |
| 4. | else |
| 5. | Initialize terminal-categories to the empty list. |
| 6. | For each element subcategory of subcategories |
| 7. | Splice at the end of terminal-categories the result of the (recursive) call terminal-specializations-of (subcategory). |
| 8. | Return terminal-categories. |

In step 7 of the match selection procedure 68, the function belief-in-hypothesis 94 is called to determine the degree of belief associated with a subset of the complete frame of discernment (i.e. the frame consisting of all the object-label nodes plus the label "none"). In particular, the belief-in-hypothesis function 94 receives inputs of a bpa which is some basic probability assignment returned by the call to the evidential processing procedure 66, and a hypothesis which is a list representing some arbitrary set. The output of the function 94 provides a "degree of belief" which is a number representing the belief in the hypothesis for the given bpa. Any input set that does not contain any of the focal elements of the bpa will be assigned a degree of belief of 0. In particular, each object-label node rejected during pruning will be given a degree of belief of 0.

The form of the function 94 is as follows:

| | belief-in-hypothesis (bpa hypothesis) |
|---|---|
| 1. | Initialize degree-of-belief to 0.0. |
| 2. | For each element pair of bpa, where pair is necessarily of the form (current-hypothesis basic-probability-number), |
| 3. | If current-hypothesis (regarded as a set) is a subset of hypothesis (also regarded as a set) |
| 4. | then add basic probability-number to degree-of-belief. |
| 5. | Return degree-of-belief. |

The foregoing function effectively implements the belief function Bel defined as $$Bel(A) = \Sigma m(B)$$

where B is a subset of A and m(B) is a basic probability number which measures the belief that is committed exactly to subset B. The values of the belief function Bel are in the closed range [0,1].

The Bel function is a key formula of the Dempster-Shafer theory of evidence. In the simple match selection procedure 68 employed in the preferred embodiment, only beliefs in singleton hypothesis are of concern. In this case the belief in a hypothesis is simply equal to the basic probability number associated with that hypothesis such that $Bel(A) = m(A)$, where A is a singleton subset of $\theta$. However, the general Bel function is used since it would be called for if more complex selection procedures were employed.

Upon completion of Steps 5-8 of the match selection procedure 68 (FIG. 7a), in which, the belief-in-hypothesis function 94 is called, a list called "matches" contains elements of the form (belief label)

where "belief" has a value set by the belief-in-hypothesis function 94. And where "label" has a value set by the "has-name" attribute of an element label node of the list of all object-label nodes that can be reached from the input category-node as determined by the function terminal-specializations-of 92.

Step 9 of the match selection procedure 68 sorts elements of the list "matches" by order of non-increasing belief, and sets the "best-match" variable to the first element of the sorted "matches" list.

The variable "best-match" is returned as the output of the matching engine program (FIG. 7a) and provides a list whose first element is either the name of an object-label node or the symbol "none" and whose second element is the corresponding degree of belief with respect to the input event being recognized and the input AM hierarchy employed.

The auxiliary functions immediate-specializations-of 96 and immediate-parts-of 98 are discussed next in conjunction with FIG. 7b. These functions are called by the previously described routines as indicated in the foregoing descriptions thereof and illustrated in FIG. 7b.

The function immediate-specializations-of 96 is provided with a node of an AM hierarchy for input, and provides for output the variables "specializations" which is a list (possible empty) of nodes that are the immediate subcategories of the input node. The function 96 has the following form:

| | immediate-specializations-of (node) |
|---|---|
| 1. | Initialize specializations to the empty list. |
| 2. | For each element downward-link of the value of attribute has-downward-links of node |
| 3. | If downward-link is of type a-specialization-link |
| 4. | then append the value of attribute has-specialization of downward-link to specializations. |
| 5. | Return specializations. |

The function immediate-parts-of 98 receives for input a node of an AM hierarchy, and provides for output the variable "parts" which is a list of nodes that are the immediate parts of the input node. The function 98 has the following form:

| | immediate-parts-of (node) |
|---|---|
| 1. | Initialize parts of the empty list. |
| 2. | For each element downward-link of the value attribute has downward-links of node |
| 3. | If downward-link is of type a-part-link |
| 4. | then append the value of attribute has-part of downward-link to parts. |
| 5. | Return parts. |

While the invention has been particularly shown and described with reference to a preferred embodiment thereof, it will be understood by those skilled in the art that various changes in form and details may be made therein without departing from the spirit and scope of the invention as defined by the appended claims.

We claim:

1. Apparatus for matching sensory data to predetermined models of desired entities, each model having a plurality of model parts, the apparatus comprising:

processor means for determining for each model matches between different portions of sensory data of interest and different parts of the predetermined model by establishing for each model and each model part a list of processor calculated degrees of match for matches between sensory data portions and model parts of the model, different degrees of match in the list corresponding to different sensory data portions matched against different model parts of the model, in each match the different sensory data portions being matched against the model parts being related to each other in a similar manner that the different model parts are related to each other and the model, each list of degrees of match having degrees of match of various permutations of a subset of sensor data portions being matched to the model parts, each degree of match being calculated (i) according to a weighted aggregation of working degrees of match between subsets of the sensory data portions associated with the degree of match and subsets of the model parts associated with the degree of match, the weighted aggregation including weights for indicating relative importance of a match between subsets of sensory data portions and subsets of model parts with respect to other matches, the weights being predefined for each model part in each model in a manner which enables scaling of matches between subsets of sensory data portions and subsets of model parts and enables matches to certain model parts to be deterministic of the sensory data, and (ii) by taking into account at least one of:

(a) indications in the model parts of expected presence and absence of each model part in each match between subsets of sensory data portions and subsets of model parts, (b) a predetermined reference degree of match for a model part, the reference degree of match being a neutral degree of match, and (c) a set of predetermined values for the weights of each model part, the weight values indicating that portion of deviation of the working degree of match from a predetermined reference degree of match, to be included in the aggregation of working degrees of match; and comparison processing means coupled to the processor means for determining a best match between the sensory data and one of the predetermined models by (i) establishing for each model a quantitative indication of belief of a match between the sensory data and that model based on at least a highest degree of match in the list of the processor calculated degrees of match of the model, and (ii) comparing the quantitative indications of the models to each other according to a predefined rule to determine one of the models to be the best match for the sensory data.

2. Apparatus as claimed in claim 1 wherein the processor means calculates a working degree of match between a sensory data portion and a model part according to functions defining the model part.

3. Apparatus as claimed in claim 1 wherein the comparison processing means compares the quantitative indications according to a predefined rule that determines the model with a greatest quantitative indication to be the best match for the sensory data.

4. Apparatus as claimed in claim 1 wherein for each degree of match in the list, the processor means calculates the degree of match according to a weighted aggregation of respective working degrees of match by (i) defining for each respective working degree of match a corresponding total degree of confidence, and (ii) combining the total degrees of confidence.

5. Apparatus as claimed in claim 4 wherein the processor means defines a total degree of confidence $c'$ from a working degree of match according to the relationship $$c'(\bar{x}_\gamma) = \begin{cases} \text{"error"} & \text{if there exists } \alpha \epsilon P_\gamma U C_{a,\gamma} \text{ with } r_{a1}(\bar{x}_{a1}) = +1 \\ & \text{and there exists } a_2 \epsilon PC_\gamma \text{ with } r_{a2}(\bar{x}_{a2}) = -1 \\ c'_{\gamma,max} & \text{if there exists } \alpha \epsilon PC_\gamma \text{ with } r_a(\bar{x}_a) = 1 \\ c'_{\gamma,min} & \text{if there exists } \alpha \epsilon PC_\gamma \text{ with } r_a(\bar{x}_a) = -1 \\ \Sigma r_a(\bar{x}_a) + L(\bar{x}_\gamma) & \text{otherwise} \\ P_\gamma U C_{a,\gamma} & \end{cases}$$

where $\gamma$ is a subset of model parts;

$\alpha$ is in the set of parts or constraints of $\gamma$; $\bar{x}$ is a vector representation of model parts and sensory data portions being matched against each other;

$PC_\gamma$ is the set of parts and constraints of $\gamma$;

$P_\gamma \cup C_{a,\gamma}$ is the set of parts of $\gamma$ and active constraints of $\gamma$;

$c'_{\gamma,max} = \Sigma W_{c,a}$;

and $c'_\gamma.\min = -\Sigma W_{d,a}$ where $W_{c,a}$ is a confirming weight of $\alpha$ and $w_{d,a}$ is a disconfirming weight of $\alpha$; and $$r_a(a) = \begin{cases} W_{c,a}c_a(x_a) & \text{if } \alpha \text{ is an element of the set of active} \\ & \text{parts and constraints of } \gamma \text{ and } c_a \geq 0 \\ W_{d,a}c_a(x_a) & \text{if } \alpha \text{ is an element of the set of active} \\ & \text{parts and constraints of } \gamma \text{ and } c_a < 0 \\ 0 & \text{if } \alpha \text{ is an element of the set of inactive} \\ & \text{parts and constraints of } \gamma \text{ and penalty} = 0 \\ W_{c,a} & \text{if } \alpha \text{ is an element of the set of inactive} \\ & \text{parts and constraints of } \gamma, \text{penalty} \neq 0, \\ & \text{and } \delta_a = -1 \\ -W_{d,a} & \text{if } \alpha \text{ is an element of the set of inactive} \\ & \text{parts and constraints of } \gamma, \text{penalty} \neq 0, \\ & \text{and } \delta_a = +1; \end{cases}$$

where $c_a$ is the normalized degree of confidence defined by $$c_a(m_a, n_a) = \begin{cases} \delta_a \dfrac{m_a - n_a}{1 - n_a} & \text{if } m_a > n_a \\ \delta_a \dfrac{m_a - n_a}{n_a} & \text{if } m_a \leq n_a \end{cases}$$

where $n_a$ is a neutral degree of match which serves as the predetermined reference of degree of match and $$n_a = \begin{cases} 0.5 & \text{if } \alpha \text{ is a terminal part or constraint;} \\ \dfrac{-c'_{a,min}}{c'_{a,max} - c'_{a,min}} & \text{if } \alpha \text{ is an internal part} \end{cases}$$

and $m_a$ is the degree of match of $\alpha$ and defined for internal part $\gamma$ with a total degree of confidence $c'_\gamma$ by $$m_\gamma(c'_\gamma) = \frac{c'_\gamma - c'_{\gamma,min}}{c'_{\gamma,max} - c'_{\gamma,min}}.$$

6. Apparatus as claimed in claim 5 wherein the comparison processing means establishes a quantitative indication of belief of match between the sensory data portions and a predetermined model according to the Dempster-Shafer theory using the ratings $r_a$.

7. Apparatus as claimed in claim 1 wherein the processor means determines a subset of the models from which to match model parts to sensory data portions.

8. Apparatus as claimed in claim 1 wherein the model parts include constraints between other model parts; and the processor means calculates a degree of match for matches between sensory data portions and a subset of model parts having a constraint therebetween according to a weighted aggregation or working degrees of match between subsets of sensory data portions associated with the degree of match and the subsets of model parts having the constraint therebetween including an indication of satisfaction of the constraint for the matches between the sensory data portions and the model parts having the constraint therebetween.

9. In an entity recognition system, apparatus for matching an input sensory data event having determined portions to predetermined models of entities desired to be recognized, each predetermined model having a plurality of model parts, the matching apparatus comprising:

processor means for determining for each predetermined model, matches between different event portions of the input sensory data event and different parts of the model by establishing a list or processor calculated degrees of match for matches between certain event portions and certain model parts of the model, different degrees of match in the list corresponding to different event portions matched against different model parts of the model, in each match the different event portions being matched against the model parts being related to each other in a similar manner that the different model parts are related to each other and the model, the list including degrees of matches for various permutations of a subset of event portions being matched to the model parts, each degree of match being calculated according to
  (i) a weighted aggregation of working degrees of match between subsets of the event portions associated with the degree of match and subsets of the model parts associated with the degree of match, the weighted aggregation including weights for indicating relative importance of a match between subsets of event portions and subsets of model parts with respect to other matches, the weights being predefined for each model part in each model in a manner which enables scaling of matches between subsets of event portions and subsets of model parts and enables matches to certain model parts to be deterministic of the sensory data event, and
  (ii) at least one of
  (a) indications in each model part of expected presence and absence of the model part in each match between subsets of event portions and subsets of model parts,
  (b) a predetermined reference degree of match for model part, the reference degree of match being a neutral degree of match, and
  (c) a set of predetermined values for the weights of each model part, the weight values indicating that portion of deviation of the working degree of match from a predetermined reference degree of match, to be included in the aggregation of working degrees of match ;and comparison processing means coupled to the processor means for determining a best match between the input sensory data event and one of the predetermined models by (i) establishing for each model a quantitative indication of belief of a match between an input event and that model based on at least a highest degree of match in the list of processor calculated degrees of match of the model, and (ii) comparing the quantitative indications of the models to each other according to a predefined rule to determine one of the models to be the best match for the input event, the comparison processing means providing an indication of the one model to the entity recognition system such that the entity recognition system identifies the input event to be of an entity corresponding to the entity of the one model.

10. Matching apparatus as claimed in claim 9 wherein the processing means calculates a working degree of match according to functions defining the model parts.

11. Apparatus as claimed in claim 9 wherein the comparison processing means establishes a quantitative indication of belief of match between the sensory data event and a predetermined model according to an evidence collection theory.

12. Matching apparatus as claimed in claim 9 wherein the comparison processing means compares the quantitative indications according to a predefined rule that determines the model with a greatest quantitative indication to be the best match for an input event.

13. Matching apparatus as claimed in claim 9 wherein for each degree of match in the list, the processor means calculates the degree of match according to a weighted aggregation of respective working degrees of match by (i) defining for each respective working degree of match a corresponding rating, and (ii) combining the ratings.

14. Matching apparatus as claimed in claim 9 wherein the processor means recursively determines matches between different event portions and different model parts.

15. Matching apparatus as claimed in claim 9 wherein the processor means determines a subset of models from which to match model parts to event portions.

16. Apparatus as claimed in claim 9 wherein the model parts include constraints between model parts; and
  the processor means calculates a degree of match for a match between a subset of event portions and a subset of model parts having a constraint between certain ones of the model parts according to a weighted aggregation of working degrees of match between the vent portions and the model parts including an indication of satisfaction of the constraint for the matches between the event portions and the certain ones of the model parts.

17. A pattern recognition system comprising:
  a plurality of models of entities of interest, the models being held in a model library, each model having a plurality of parts arranged in a hierarchy;
  a source of data events of detected entities to be identified by the system;
  a matching module adapted to receive a data event from the source and models from the model library to match the event to a model, the matching module having:
  a) processor means for recursively determining, for each predetermined model, matches between different event portions of the data event and different parts of the model by establishing a list or processor calculated degrees of match between certain event portions and certain model parts of the model, different degrees of match in the list corresponding to different event portions matched against different parts of the model, in each match the different event portions being matched against the model parts being related to each other in a similar manner that the different model parts are related to each other and the model, the list of degrees of match having degrees of matches of various permutations of a subset of event portions being matched to the model parts, each degree of match being calculated according to
  (i) a weighted aggregation of working degrees of match between subsets of the vent portions associated with the degree of match and subsets of the model parts associated with the degree of match, the weighted aggregation including weights for indicating relative importance of a match between subsets of event portions and subsets of model parts with respect to other matches, the weights being predefined for each model part in each model in a manner which enables scaling of matches between subsets of event portions and subsets of model parts and enables matches to certain model parts to be deterministic of the data event, and
  (ii) at least one of
  (A) indications in each model part of expected absence and presence of the model art in each match between subsets of event portions and subsets of model parts,
  (B) a predetermined reference degree of match for a model part, the reference degree of match being a neutral degree of match, and (C) a set of redetermined values for the weights of each model part, the weight value indicating that portion of deviation of the working degree of match from a predetermined reference degree of match, to be included in the aggregation working of degrees of match; and b) comparison processing means coupled to the processor means for determining a best match between the data event and one of the models by (i) establishing for each model a quantitative indication of belief of a match between the vent and that model based on at least a highest degree of match in the list of processor calculated degrees of match of the model, and (ii) comparing the quantitative indications of the models to each other according to a predefined rule to determine one of the models to be the best match for the event; and an output member coupled to the matching module for receiving from the comparison processing means an indication of the one model determined to be the best match for the data event from the source, the output member providing an indication of the entity corresponding to the one model to identify the detected entity of the event.

18. A system as claimed in claim 17 wherein the models are contour-based models.

19. A system as claimed in claim 17 wherein the models are region-based models.

20. A system as claimed in claim 17 wherein the processor means calculates a working degree of match between an event portion and a model part according to a function defining the model part.

21. A system as claimed in claim 17 wherein the comparison processing means compares the quantitative indications according to a predefined rule that determines the model with a greatest quantitative indication to be the best match for the data event.

22. A system as claimed in claim 17 wherein the processor means determines a subset of models from which to match model parts to event portions.

23. A system as claimed in claim 17 wherein for each degree of match in the list, the processor means calculates the degree of match according to a weighted aggregation of respective working degrees of match by (i) defining for each respective working degree of match a corresponding rating, and (ii) combining the ratings.

24. A system as claimed in claim 17 wherein the model parts include constraints between other model parts.

25. A method of matching sensory data to predetermined models of desired entities, each model having a plurality of model parts, the method comprising the steps of:

determining for each model matches between different portions of sensory data of interest and different parts of the predetermined model by establishing for the model a list or processor calculated degrees of match between sensory data portions and model parts of the model, different degrees of match in the list corresponding to different sensory data portions matched against different model parts of the model, in each match the different sensory data portions being match against the model parts being related to each other in a similar manner that the different model parts are related to each other and the model, the list of degrees of match having degrees of match of various permutations of a subset of sensory data portions being matched to the model parts, each degree of match being calculated according to (i) a weighted aggregation of working degrees of match between subsets of the sensory data portions associated with the degree of match and subsets of the model parts associated with the degree of match, the weighted aggregation including weights for indicating relative importance of a match between subsets of sensory data portions and subsets of model parts with respect to other matches, the weights being predefined for each model part in each model in a manner which enables scaling of matches between subsets of sensory data portions and subsets of model parts and enables matches to certain model parts to be deterministic of the sensory data, and (ii) at least one of (a) indications in each model part of expected presence and absence of the model part in each match between subsets of sensory data portions and subsets of model parts, (b) a predetermined reference degree of match for a model part, the reference degree of match being a neutral degree of match; and (c) a set of predetermined values for the weights of each model part, the weight values indicating that portion of deviation of the working degree of match from a predetermined reference degree of match, to be included in the aggregation of working degrees of match; and determining a best match between the sensory data and one of the predetermined models by (i) establishing for each model a quantitative indication of belief of a match between the sensory data and that model based on at least a highest degree of match in the list of the processor calculated degrees of match of the model, and (ii) comparing the quantitative indications of the models to each other according to a predefined rule to determine one of the models to be the best match for the sensory data.

26. Apparatus as claimed in claim 1 wherein the comparison processing means establishes a quantitative indication of belief of match between the sensory data portion and a predetermined model according to an evidence collection theory.

27. Apparatus as claimed in claim 1 wherein the processor means employs in each model part a confirming weight and a disconfirming weight as the weights included in the weighted aggregation to calculate the weighted aggregation of working degrees of match.

28. Apparatus as claimed in claim 8 wherein for each subset of model parts, the processor means includes in the weighted aggregation of corresponding working degrees of match, a factor indicating contribution of unmatched constraints for the subset of model parts.

29. Matching apparatus as claimed in claim 1 wherein the comparison processing means establishes a quantitative indication of belief of a match between an input event and a predetermined model according to Dempster-Shafer theory of evidence using a rating.

30. Apparatus as claimed in claim 9 wherein for each model the processor means employs a confirming weight and a disconfirming weight as the weights included in the weighted aggregation to calculate the weighted aggregation of working degrees of match.

31. Apparatus as claimed in claim 16 wherein for each subset of model parts, the processor means includes in the weighted aggregation of corresponding working degrees of match, a factor indicating contribution of unmatched constraints for the subset of model parts.

32. Apparatus as claimed in claim 17 wherein the comparison processing means establishes a quantitative indication of belief of match between a data event and a predetermined model according to an evidence collection theory.

33. Apparatus as claimed in claim 17 wherein for each model part the processor means employs confirming and disconfirming weights as the weights included in the weighted aggregation to calculate the weighted aggregation of working degrees of match.

34. Apparatus as claimed in claim 24 wherein for each subset of model parts, the processor means includes in the weighted aggregation of corresponding working degrees of match, a factor indicating contribution of unmatched constraints for the subset of model parts.

35. Apparatus for matching sensory data to predetermined models of desired entities comprising:

(a) processor means for determining for each model matches between different portions of sensory data of interest and different parts of the predetermined model by establishing for each model a list of processor calculated degrees of match between sensory data portions and model parts of the model, different degrees of match in the list corresponding to different sensory data portions matched against different model parts of the model, each degree of match being calculated according to an aggregation of working degrees of match between subsets of the sensory data portions associated with the degree of match and subsets of the model parts associated with the degree of match, in each match the different model parts being related to each other and the model in a similar manner that the different sensory data portions being matched against the model parts are related to each other and the whole sensory data, and each degree of match being calculated according to an aggregation of respective working degrees of match by (i) defining for each respective working degree of match a corresponding total degree of confidence $c'$ according to the relationship $$c'(\bar{x}_\gamma) = \begin{cases} \text{"error"} & \text{if there exists } a_1 \epsilon PC_\gamma \text{ with } r_{a1}(\bar{x}_{a1}) = +1 \\ & \text{and there exists } a_2 \epsilon PC_\gamma \text{ with } r_{a2}(\bar{x}_{a2}) = -1 \\ c'_{\gamma,max} & \text{if there exists } a \epsilon PC_\gamma \text{ with } r_a(\bar{x}_a) = 1 \\ c'_{\gamma,min} & \text{if there exists } a \epsilon PC_\gamma \text{ with } r_a(\bar{x}_a) = -1 \\ \Sigma\, r_a(\bar{x}_a) + L(\bar{x}_\gamma) & \text{otherwise} \\ a \epsilon P_\gamma UC_{a,\gamma} \end{cases}$$

where
is a subset of model parts;
is in the set of parts or constraints of $\gamma$;
$\bar{x}$ is a vector representation of model parts and sensory data portions being matched against each other;
$PC_\gamma$ is the set of parts and constraints of $\gamma$; $P_\gamma U C_{a,\gamma}$ is the set of parts of $\gamma$ and active constraints of $\gamma$;

$$c'_{\gamma,max} = \Sigma W_{c,a};$$

and $$c'_{\gamma,min} = -\Sigma W_{d,a}$$

where $W_{c,a}$ is a confirming weight of $a$ and $W_{d,a}$ is a disconfirming weight of $a$; and $$r_a(\bar{x}_a) = \begin{cases} W_{c,a}c_a(\bar{x}_a) & \text{if } a \text{ is an element of the set of active parts and constraints of } \gamma \text{ and } c_a \geq 0 \\ W_{d,a}c_a(\bar{x}_a) & \text{if } a \text{ is an element of the set of active parts and constraints of } \gamma \text{ and } c_a < 0 \\ 0 & \text{if } a \text{ is an element of the set of inactive parts and constraints of } \gamma \text{ and penalty} = 0 \\ W_{c,a} & \text{if } a \text{ is an element of the set of inactive parts and constraints of } \gamma, \text{ penalty} \neq 0, \text{ and } \delta_a = -1 \\ -W_{d,a} & \text{if } a \text{ is an element of the set of inactive parts and constraints of } \gamma, \text{ penalty} \neq 0, \text{ and } \delta_a = +1, \end{cases}$$

and (ii) combining the total degrees of confidence; and (b) comparison processing means coupled to the processor means for determining a best match between the sensory data and one of the predetermined models by (i) establishing for each model a quantitative indication of belief of a match between the sensory data and that model based on at least a highest degree of match in the list of the processor calculated degrees of match of the model, and (ii) comparing the quantitative indications of the models to each other according to a predefined rule to determine one of the models to be the best match for the sensory data.

* * * * *

UNITED STATES PATENT AND TRADEMARK OFFICE
CERTIFICATE OF CORRECTION

PATENT NO. : 5,123,057

DATED : June 16, 1992

INVENTOR(S) : Jacques G. Verly, Bryan Williams and Richard L. Delanoy

It is certified that error appears in the above-identified patent and that said Letters Patent is hereby corrected as shown below:

Column 51, Claim 5, line 5 of that claim (the equation first line) after "exists" change "$\alpha \epsilon P_\gamma UC_{a,\gamma}$" to read ---$\alpha_1 \epsilon PC_\gamma$---.

Column 51, Claim 5, line 10 of that claim (last line of the equation) change "$P_\gamma UC_{a,\gamma}$" to read ---$\alpha \epsilon P_\gamma UC_{a,\gamma}$---.

Column 51, Claim 5, line 17 of that claim before "is" change "$P_\gamma UC_{\alpha,\gamma}$" to read ---$P_\gamma UC_{a,\gamma}$---.

Column 51, Claim 5, line 22 of that claim after "and" change "$w_{d,\alpha}$" to read ---$W_{d,\alpha}$---.

Column 51, Claim 5, line 24 of that claim (first line of the equation) change "$W_{c,\alpha} c_\alpha (x_\alpha)$" to read ---$W_{c,\alpha} c_\alpha (\bar{x}_\alpha)$---.

Column 51, Claim 5, line 26 of that claim (line three of equation) change "$W_{d,\alpha} c_\alpha (x_\alpha)$" to read ---$W_{d,\alpha} c_\alpha (\bar{x}_\alpha)$---.

Column 51, Claim 5, line 30 of that claim (left hand side of equation) before "=" change "$r_\alpha(\alpha)$" to read ---$r_\alpha(\bar{x}_\alpha)$---.

Column 52, line 39 (Claim 8, line 7 of that claim) after "aggregation" change "or" to read ---of---.

Column 52, line 57 (Claim 9, line 10 of that claim) after "list" change "or" to read ---of---.

Column 54, line 33 (Claim 17, line 14 of that claim) after "list" change "or" to read ---of---.

Column 54, line 63 (Claim 17, line 44 of that claim) after "model" change "art" to read ---part---.

UNITED STATES PATENT AND TRADEMARK OFFICE
CERTIFICATE OF CORRECTION

PATENT NO.   :   5,123,057

DATED        :   June 16, 1992

INVENTOR(S)  :   Jacques G. Verly, Bryan Williams and Richard L. Delanoy

It is certified that error appears in the above-identified patent and that said Letters Patent is hereby corrected as shown below:

Column 55, line 1 (Claim 17, line 50 of that claim) before "values" change "redetermined" to read ---predetermined---.

Column 55, line 2 (Claim 17, line 51 of that claim) before "indicating" change "value" to read ---values---.

Column 55, line 11 (Claim 17, line 60 of that claim) before "and" change "vent" to read ---event---.

Column 55, line 57 (Claim 22, line 8 of that claim) after "list" change "or" to read ---of---.

Column 56, line 57 (Claim 29, line 1 of that claim) before "wherein" change "1" to read ---11---.

Column 58, line 14 (Claim 35, line 34 of that claim) before " is a subset" insert ---γ---.

Column 58, line 15 (Claim 35, line 35 of that claim) before "is in the set" insert ---α---.

Signed and Sealed this

Twenty-first Day of September, 1993

Attest:

BRUCE LEHMAN

*Attesting Officer*    *Commissioner of Patents and Trademarks*